United States Patent [19]
Lund

[11] Patent Number: 5,533,046
[45] Date of Patent: Jul. 2, 1996

[54] SPREAD SPECTRUM COMMUNICATION SYSTEM

[76] Inventor: VanMetre Lund, 2294 Elm Ridge Dr., Northbrook, Ill. 60062

[21] Appl. No.: 174,143

[22] Filed: Dec. 28, 1993

Related U.S. Application Data

[63] Continuation-in-part of Ser. No. 959,025, Oct. 8, 1992, abandoned.

[51] Int. Cl.[6] .................................................... H04K 1/10
[52] U.S. Cl. ........................................ 375/200; 380/34
[58] Field of Search ................................ 380/34; 325/1

[56] References Cited

U.S. PATENT DOCUMENTS

| | | | |
|---|---|---|---|
| Re. 34,831 | 1/1995 | Lund | 375/1 |
| 2,530,140 | 11/1950 | Atkins | 380/6 |
| 3,550,002 | 12/1970 | Shostak et al. | 380/48 |
| 3,878,527 | 4/1975 | Rensin et al. | 375/1 X |
| 3,890,472 | 6/1975 | Fisk et al. | 370/9 |
| 3,928,813 | 12/1975 | Kingsford-Smith | 331/1 A |
| 4,032,885 | 6/1977 | Roth | 314/715.11 |
| 4,052,565 | 10/1977 | Baxter et al. | 375/1 |
| 4,142,240 | 2/1979 | Ward et al. | 364/717 |
| 4,234,930 | 11/1980 | Campbell | 64/724.11 |
| 4,276,652 | 6/1981 | McCalmont et al. | 455/29 |
| 4,301,537 | 11/1981 | Roos | 375/1 |
| 4,423,517 | 12/1983 | Danno et al. | 375/1 |
| 4,435,822 | 3/1984 | Spencer et al. | 375/1 |
| 4,538,280 | 8/1985 | Mosely, Jr. et al. | 370/9 |
| 4,635,274 | 1/1987 | Kubota et al. | 375/1 |
| 4,653,068 | 3/1987 | Kadin | 375/1 |
| 4,672,605 | 6/1987 | Hustig et al. | 370/76 |
| 4,672,658 | 6/1987 | Kavehrad et al. | 379/63 |
| 4,790,009 | 12/1988 | Ishigaki et al. | 380/9 |
| 4,841,545 | 6/1989 | Endo et al. | 375/1 |
| 4,852,121 | 7/1989 | Kingston et al. | 375/1 |
| 4,903,279 | 2/1990 | Murakami et al. | 379/63 |
| 4,912,722 | 3/1990 | Carlin | 375/1 |
| 4,930,139 | 5/1990 | Chandler et al. | 375/1 |
| 4,941,150 | 7/1990 | Iwasaki | 375/1 |
| 4,977,578 | 12/1990 | Ishigaki et al. | 375/1 |
| 5,008,899 | 4/1991 | Yamamoto | 375/1 |
| 5,029,181 | 7/1991 | Endo et al. | 375/1 |
| 5,031,191 | 7/1991 | Hiramatsu et al. | 375/1 |
| 5,048,052 | 9/1991 | Hamatsu et al. | 375/1 |
| 5,048,053 | 9/1991 | Mower et al. | 375/1 |
| 5,056,108 | 10/1991 | Lund | 375/1 |
| 5,062,121 | 10/1991 | Kurikara et al. | 375/1 |

(List continued on next page.)

FOREIGN PATENT DOCUMENTS 0084967  1/1983  European Pat. Off. ....... H04K 1/100

OTHER PUBLICATIONS

Taub, H. & Schilling, D. L. "Principles of Communication Systems" McGraw–Hill, New York; pp. 729,741, FIGS. 5–2,7–1; 1980.

Primary Examiner—David C. Cain

[57] ABSTRACT

In a one embodiment of a spread spectrum communication system, an unmodulated synchronization wavetrain and one or more modulated intelligence wavetrains are generated in timed relation and are concurrently propagated but separately detected in a receiver. In another embodiment, wavetrains are modulated by opposite phases of an intelligence signal and so detected in a receiver as to produce a synchronization control signal and an intelligence signal by summing and comparing two received signals. Under microprocessor control, the phase of operation of the sequence generators of the receiver is adjusted to obtain phase and frequency information for effecting phase control for synchronization and also to controllably swallow cycles and accurately adjust the effective frequency of the clock signal. Each sequence generator includes a memory which stores data to control one counter and to define the durations and order of variations of a sequence, the memory being indexed by a second counter at the end of each sequence. The wavetrains may be transmitted on at least one carrier and preferably on a plurality of carriers of different frequencies to transmit energy in a generally uniformly distributed manner in a higher frequency range which may be as wide a range as may be advantageous.

35 Claims, 20 Drawing Sheets

U.S. PATENT DOCUMENTS

| | | | |
|---|---|---|---|
| 5,063,560 | 11/1991 | Yerbury et al. | 370/18 |
| 5,067,136 | 11/1991 | Arthur et al. | 375/1 |
| 5,084,901 | 1/1992 | Nagazumi et al. | 375/1 |
| 5,090,023 | 2/1992 | Watanabe et al. | 375/1 |
| 5,090,024 | 2/1992 | Vander Mey et al. | 375/1 |
| 5,093,841 | 3/1992 | Vancraeynest | 375/1 |
| 5,101,417 | 3/1992 | Richley et al. | 375/1 |
| 5,105,437 | 4/1992 | Kingston et al. | 375/1 |
| 5,111,478 | 5/1992 | McDonald | 375/1 |
| 5,113,443 | 5/1992 | Brockman | 380/34 |
| 5,121,408 | 6/1992 | Cai et al. | 375/1 |
| 5,150,377 | 9/1992 | Vannucci | 375/1 |
| 5,153,598 | 10/1992 | Alves, Jr. | 375/1 X |
| 5,168,508 | 12/1992 | Iwasaki et al. | 375/1 |
| 5,204,877 | 4/1993 | Endo et al. | 375/1 |
| 5,208,829 | 4/1993 | Soleimani et al. | 375/1 |
| 5,208,830 | 4/1993 | Cornec et al. | 375/1 |
| 5,210,770 | 5/1993 | Rice | 375/1 |
| 5,235,613 | 8/1993 | Brown et al. | 375/1 |
| 5,263,045 | 11/1993 | Schilling | 375/1 |
| 5,375,141 | 12/1994 | Takahashi | 375/1 |

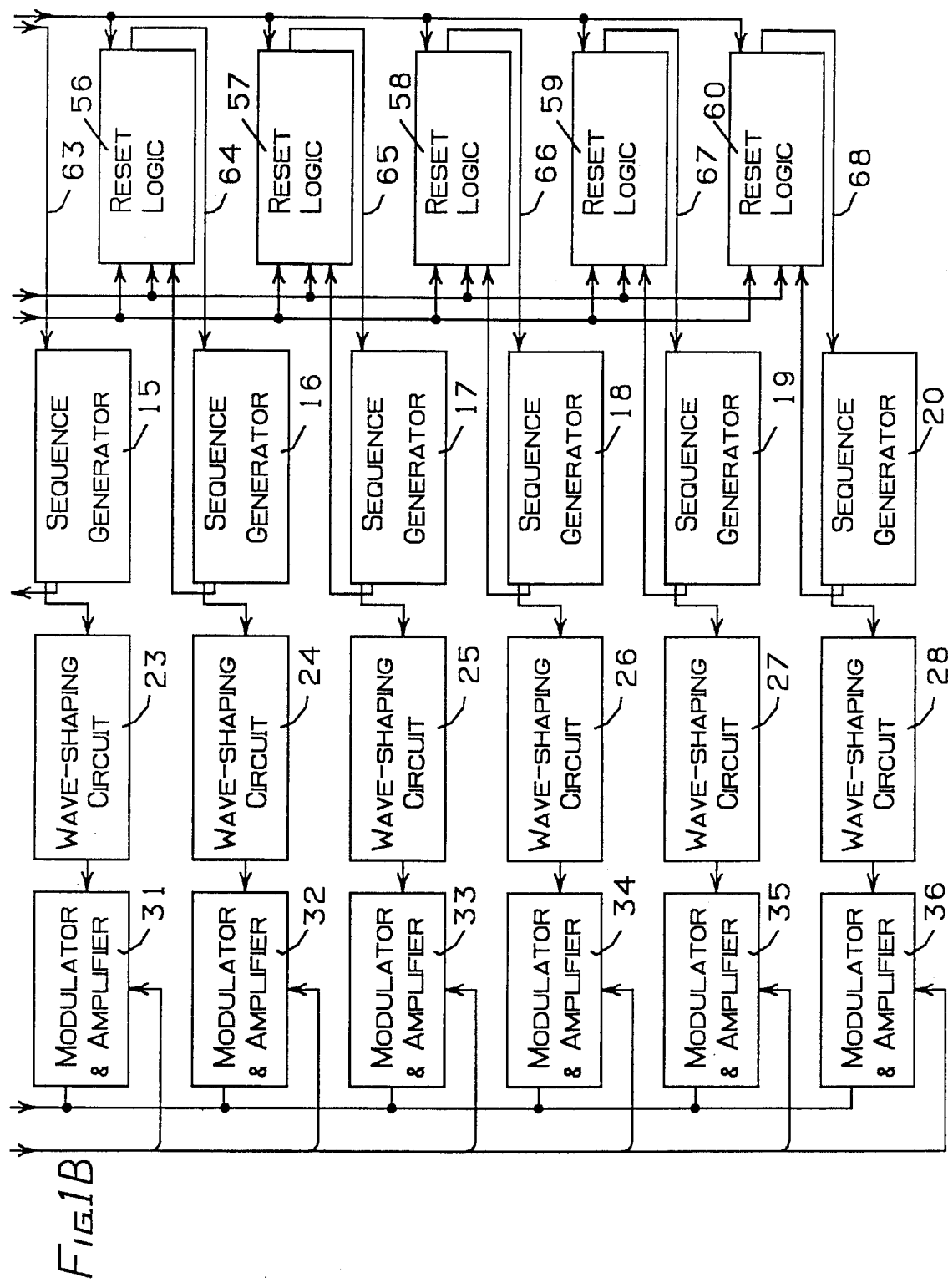

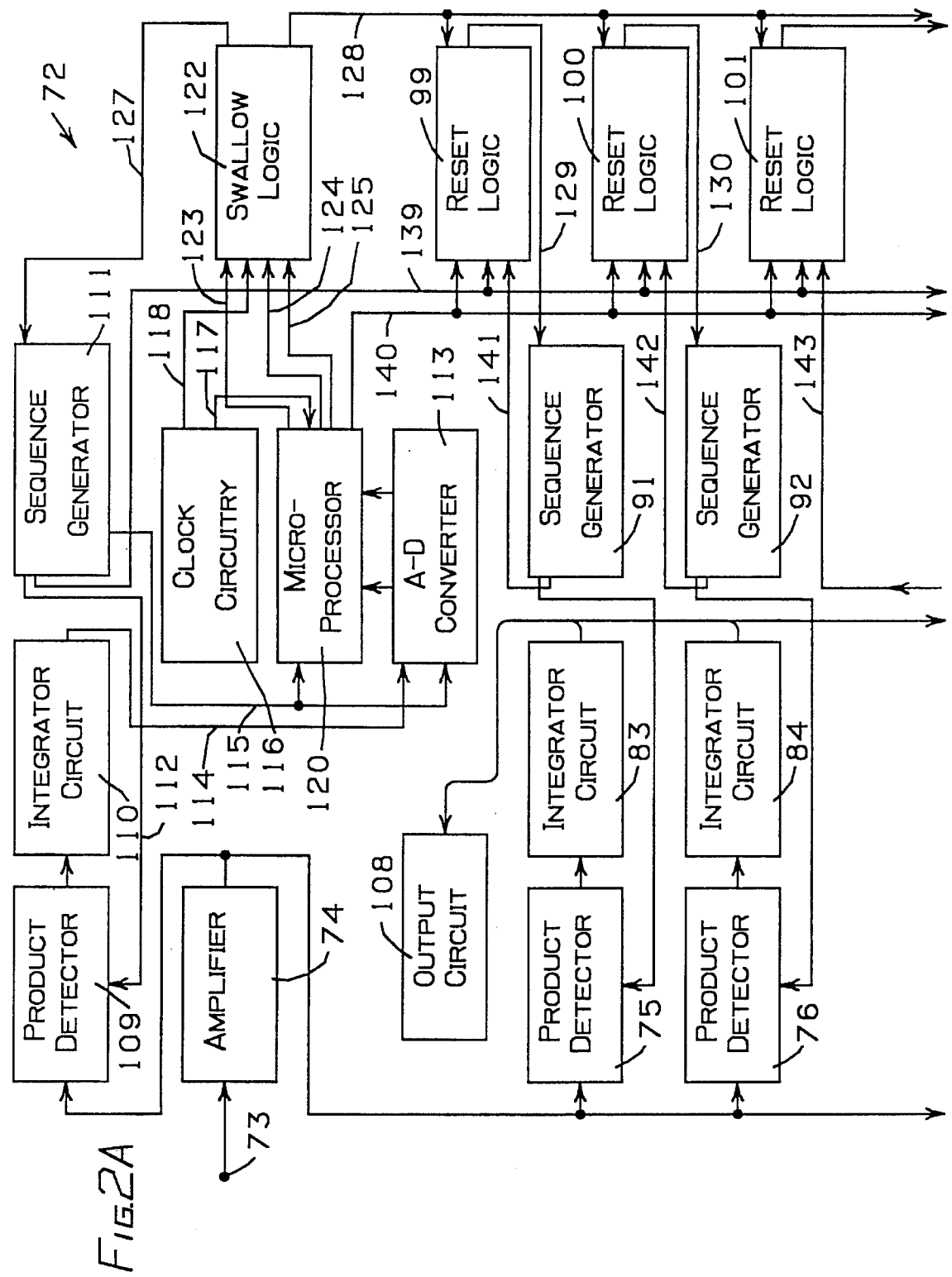

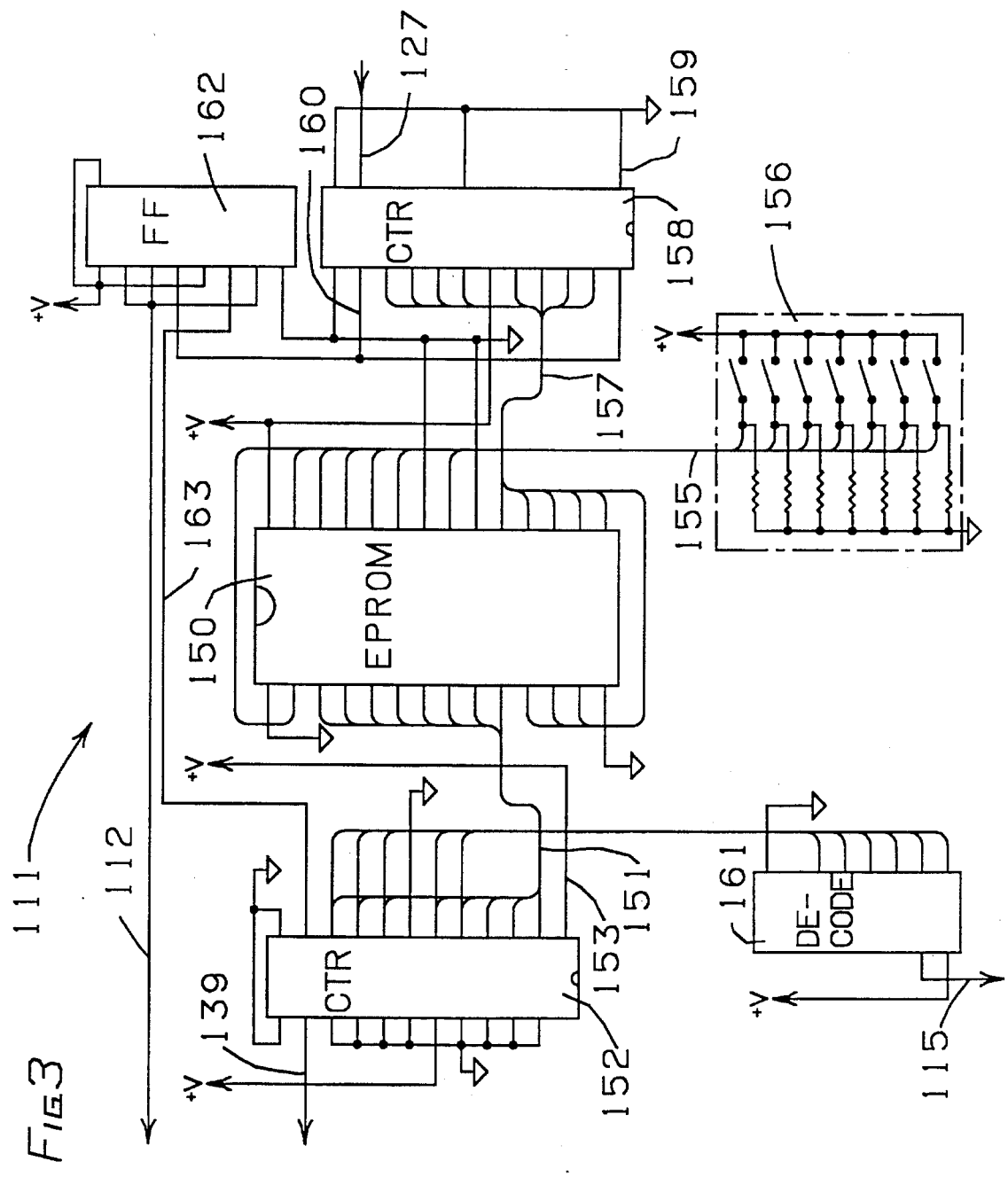

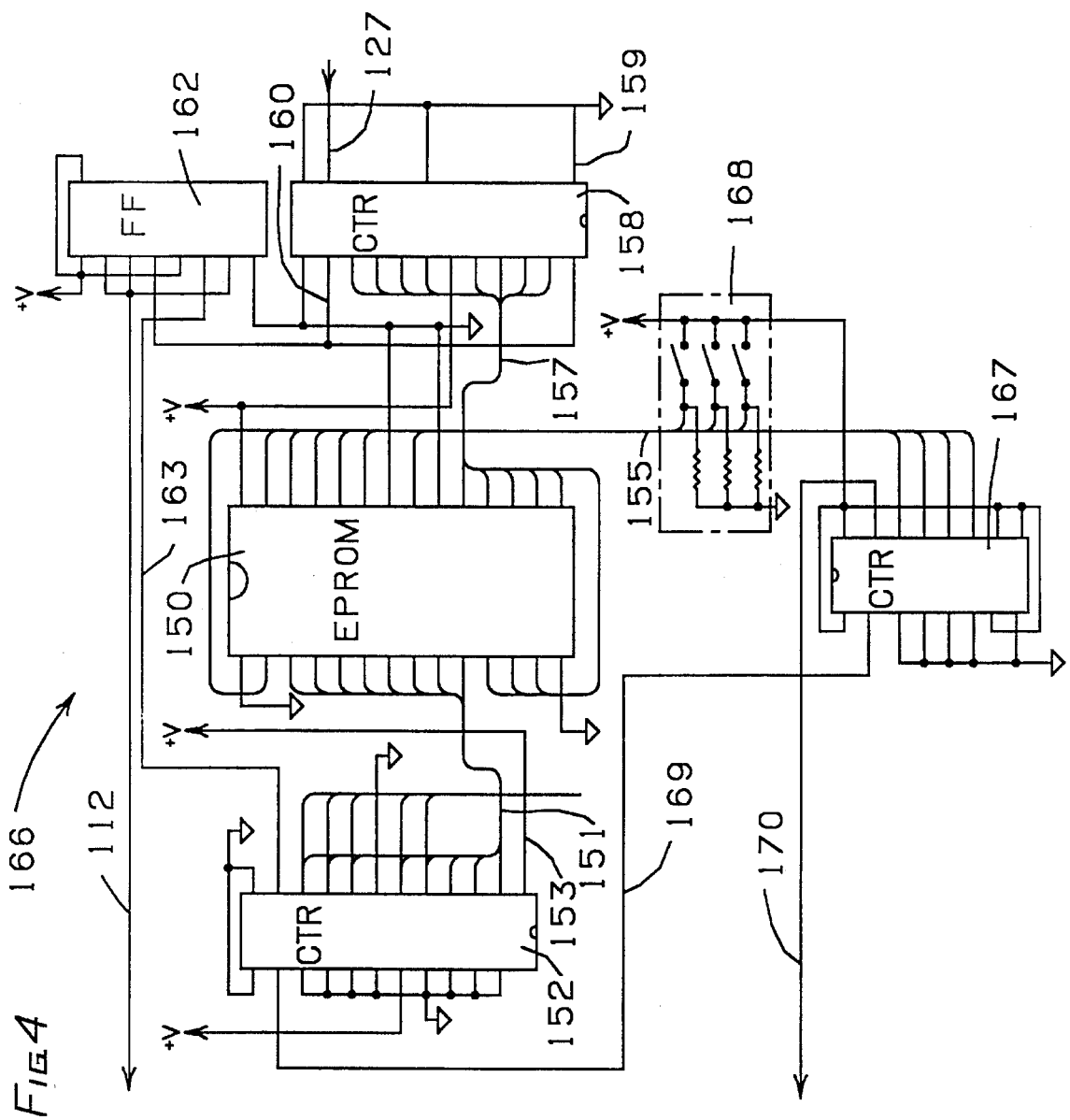

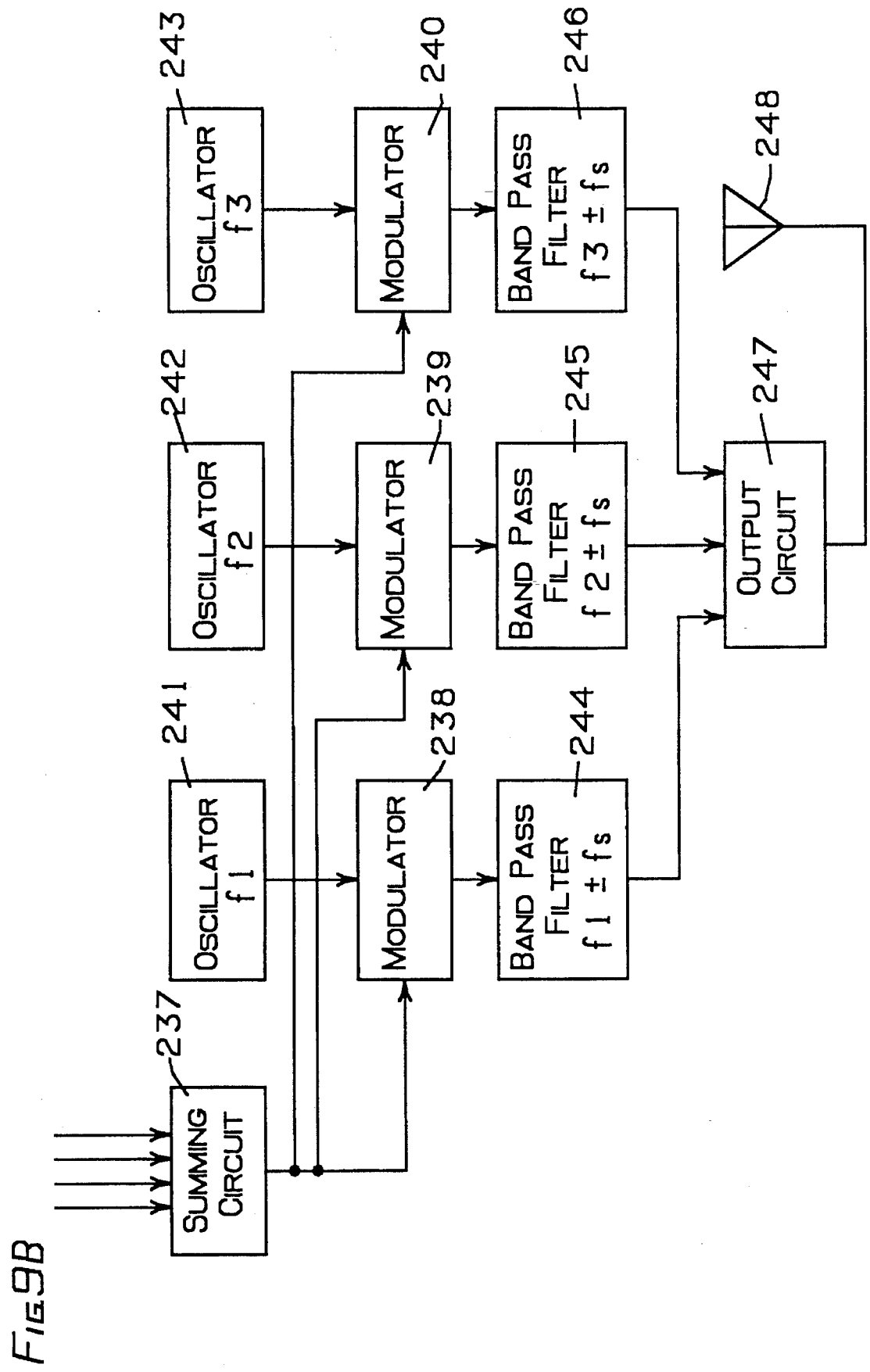

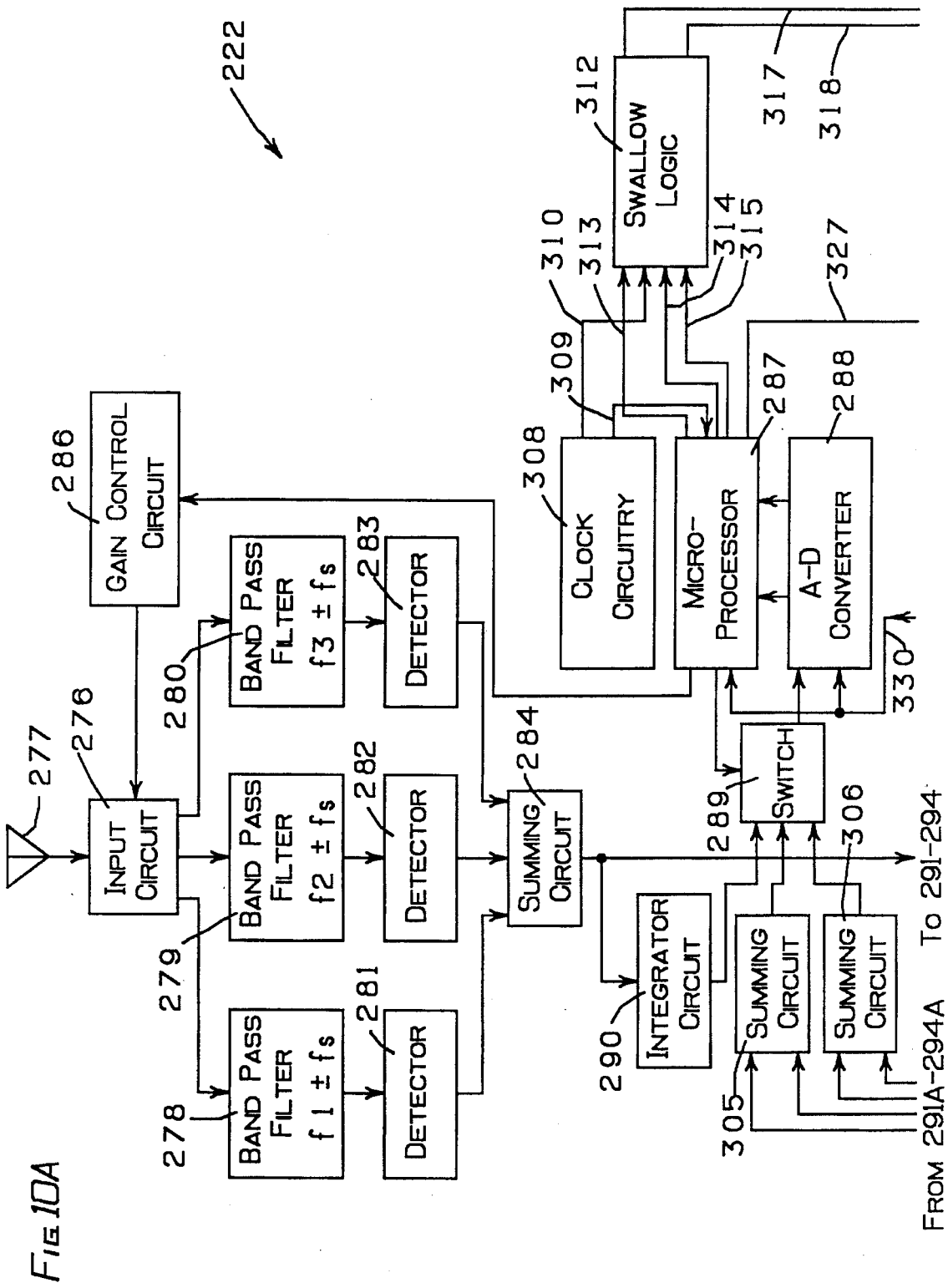

SPREAD SPECTRUM COMMUNICATION SYSTEM

CROSS REFERENCES TO RELATED APPLICATIONS

This application is a continuation-in-part of my application Ser. No. 07/959,025, filed Oct. 8, 1992 and entitled "SPREAD SPECTRUM COMMUNICATION SYSTEM" now abandoned. Said application is directed to improvements upon my invention as disclosed in application Ser. No. 505,239, filed Apr. 4, 1990 and issued as U.S. Pat. No. 5,056,108 on Oct. 8, 1991, entitled "COMMUNICATION SYSTEM". An application for reissue of said patent was filed Oct. 5, 1992, Ser. No. 08/132,158. Any disclosures of said applications and patent which are not included herein are incorporated by reference.

BACKGROUND OF THE INVENTION

1. Field of the Invention

This invention relates to a communication system and more particularly to a communication system which uses a distribution of propagated energy over a wide frequency spectrum in a manner such as to obtain reliable operation while minimizing interference with propagation of other signals. The system is readily implemented through the use of digital circuitry and is otherwise readily and economically manufacturable.

2. Background of the Prior Art

My aforesaid U.S. Patent issued Oct. 8, 1991 discloses a communication system in which wavetrains are propagated from a transmitting point to a receiving point, each wavetrain comprising a sequence of alternations having predetermined varying durations and propagated in a predetermined distinctive order. Energy received at a receiving point is sampled at sampling times having durations and an order corresponding to the predetermined varying durations of the transmitted wavetrains.

Important features of the invention disclosed in my said patent relate to the use of digital circuitry for establishing the durations and sequence of the propagated wavetrains and also of the sampling operation, to synchronization of sampling at the receiving point with the generation of the propagated wavetrains and to provisions for simultaneous transmission on a plurality of channels.

The system of my said patent is a spread spectrum system in that the propagated energy is in effect spread or distributed over a substantial range of frequencies, rather than being concentrated in a relatively narrow range of frequencies, as in the case of conventional AM and FM systems. Many other spread spectrum systems have been known or proposed, including direct sequence systems in which the phase of a carrier is controlled by a code sequence, frequency hopping systems in which a carrier frequency is shifted in accordance with a code sequence, pulsed-FM or "chirp" systems in which the frequency of a carrier is periodically swept over an interval of time, time hopping systems in which a carrier is transmitted at times determined by a code sequence and hybrids of two or more of such direct sequence, frequency hopping chirp and time hopping systems. Many of such systems have substantial success but in general they are complex, expensive and not always reliable.

SUMMARY OF THE INVENTION

This invention was evolved with the general object of extending the objectives of my issued patent, particularly with regard to providing a high degree of accuracy and reliability in effecting communications, while minimizing cost of manufacture.

Another object of the invention is to provide systems for frequency control and for synchronization which are usable for various types of spread spectrum communication system and for other applications as well.

Important aspects of the invention relate to and are best understood from an analysis of the basic features necessary for a system which transmits of intelligence by modulation of a carrier signal. In general, if not in all cases, such systems require that the carrier signal have a certain pattern of variations over a period of time, a modulation of the carrier signal in accordance with intelligence and a sampling of received energy to recognize the pattern, accumulate a response thereto and detect modulation.

For example, the pattern of a carrier of an AM broadcast station which is received by tuning to 1000 on a receiver dial is simply a repetitive sine wave at a frequency of 1000 KHz. To recognize such a pattern, the receiver generally includes resonant inductance-capacitance circuits which may be tuned by the dial to 1000 KHz and/or to an intermediate "IF" frequency such as 456 KHz, developed by mixing a 1000 KHz input signal with a 1456 KHz sine wave signal from a tunable oscillator controlled by the dial. Such resonant circuits serve a sampling function in that they accumulate energy in response to variations which during the duration of a complete cycle at the frequency of resonance are of one polarity during one half cycle and of the opposite polarity during the next half cycle. When such variations appear in a repetitive pattern, more and more energy is accumulated in such resonant circuits. Amplitude changes in the accumulated energy are detected to develop the transmitted intelligence.

Reception of FM is similar, differing in that deviations in frequency from a center frequency are detected to develop the transmitted intelligence.

In one form of a direct sequence spread spectrum system, a code signal may be generated having either a "one" value or a value of "zero", occurring in certain pattern as a function of time. For example, the code signal may have a "one" value during ten time intervals or "chips" of equal duration, then a "zero" value during the next five chips, then a "one" value during the next two chips, then a "zero" during the next seven chips, and so on. A sine wave carrier of a fixed frequency may be modulated by such a code signal to have one phase when the code signal has a "one" value and to have an opposite 180 degree phase shift when the code signal is a "zero" value. To recognize such a pattern, a receiver may include one or more resonant circuits tuned to the carrier frequency and/or to an IF frequency, and may in addition use a code signal of the same form as in the transmitter in a manner such as to effectively perform no phase shift when the code signal has a "one" value and a 180 degree phase shift of the carrier when the code signal has a "zero" value.

In one form of a frequency hopping spread spectrum system, a sine wave carrier is generated at first frequency during one time interval or "chip" of a certain duration, at second and different frequency during the next chip, at a third and still different frequency during the next chip, and so on. Resonant circuits are generally used in recognizing such a pattern. The tuning of resonant circuits may be changed from one chip interval to the next in the same pattern as in the transmitter. Alternatively or in addition, the frequency of a local oscillator signal which is mixed with the received signal may be shifted from one chip internal to the next in a pattern corresponding to the pattern of the transmitted signal, the mixed signal being applied to a resonant circuit tuned to a fixed IF frequency. In prior art frequency hopping systems, many cycles are transmitted at each frequency to minimize problems with a "settling time" required for receiver circuits to adjust to a new frequency.

In chirp systems in which the frequency of a carrier is periodically swept over a certain range over an interval of time, the frequency of a local oscillator signal may be swept over a corresponding range to be mixed with a received signal and then applied to an IF amplifier having resonant circuits tuned to one frequency.

In the system disclosed in my aforesaid U.S. Pat. No. 5,056,108, a wavetrain is propagated having a form quite different from the carrier signals developed in direct sequence, frequency hopping and chirp systems. In particular, a wavetrain is propagated which includes a sequence of variations having predetermined varying durations and being in a predetermined distinctive pseudo-random order. In the system as disclosed, each variation has one polarity during an initial phase of the variation and an opposite polarity during a final phase of the variation. As is also disclosed, each phase of one polarity is followed by a phase of the opposite polarity which is of substantially the same amplitude and duration.

Sequence generators of identical form are provided in both a transmitter and a receiver. The transmitted wavetrain is developed from the output of a filter which is coupled to the output of the transmitter sequence generator. In the receiver, the output of the sequence generator and a received signal are applied to a product detector, thereby sampling the received signal at sampling times having the predetermined varying durations and the predetermined distinctive order of the transmitted wavetrains. The output of the product detector is applied through an integrator circuit to develop a final output signal.

For the purpose of comparison with other spread spectrum systems and for providing an idea of the frequency composition of a transmitted signal, this system may be considered to be a frequency hopping system in which each variation has the effect of constituting one complete cycle at a single frequency, each variation having an initial portion of one polarity and a final portion of an opposite polarity. If such initial and final portions are of equal duration and magnitude and particularly if they approach the form of sequential half cycles of a sine wave, the primary energy component thereof is at a frequency in hertz which is the reciprocal of the duration of the variation in seconds. In this connection, it is noted that resonant circuits of some form are generally used for measuring the spectral distribution of varying fields and that application of two successive pulse signals of equal amplitude and opposite polarity to a resonant circuit will build up energy in the circuit to a maximum extent if each such pulse signal has a duration of one half of a cycle at the resonant frequency of the circuit.

An analysis of the spectral distribution of transmitted signals is important for a number of reasons including the fact that channels are allocated by the Federal Communication Commission on the basis of frequency. Statistical analyses may also be used for determining the efficacy of the system with respect to minimizing response to noise, transmissions on single carrier frequencies and spread spectrum transmissions and with respect to minimizing interference with receptions on single carrier frequencies or by other spread spectrum systems. For example, the efficacy of the system with respect to rejecting fixed frequency or random signals may be determined by calculating the odds that a signal will be received which will contain, over an assumed time of integration, a pattern of signal components having the same distinctive pattern as the transmitted wavetrain, each having one polarity and magnitude during an initial phase and an opposite polarity and same magnitude during the final phase.

Each sequence generator is advantageously constructed through the use of digital circuitry which includes a programmable counter coupled to a memory and controlling switching of a flip-flop between first and second states. In the generation of one variation of a wavetrain, the durations of the two states may be equal so as to substantially eliminate any DC component. It is also an advantage that the system can be readily programmed to establish the range of frequencies over which components are spread and to obtain uniform spreading of energy over the established range of frequencies.

Another important feature of the system as disclosed in my aforesaid U.S. Pat. No. 5,056,108 is that a number of independent channels may be provided, using a sequence generator and product generator for each channel but using common synchronizing circuitry, different values being contained in the memories of the sequence generators. For example, eight additional channels may be provided for "parallel" transmission of digital data between the data bus of an eight bit processor and a printer, modem or other peripheral.

Further features of the system as disclosed in my aforesaid U.S. Pat. No. 5,056,108 include synchronization of sequence generator of the receiver, using a pulse-swallower and using a controlled slow sweep of a clock frequency through a certain range to detect and maintain an optimum condition.

Systems are disclosed in my aforesaid prior copending application Ser. No. 07/959,025 which utilize and extend the advantages of the system as disclosed in my aforesaid U.S. Pat. No. 5,056,108 and which form part of this disclosure. Important features relate to the use of microprocessors for accurate control of frequency adjustments and for synchronization spread spectrum or other similar systems.

Further important features relate to the swallowing clock cycles, preferably effected under microprocessor control, and performed in a manner such as to permit accurate control of the frequency of a sequence generator or other controlled device, and to permit accurate synchronization of the operations of sequence generators of transmitters and receivers, or other devices which are controlled.

Additional important features relate to the effecting of reset operations in a manner such as to obtain highly accurate synchronization of the operations of sequence generators of transmitters and receivers or other devices to be controlled.

Still further features relate to the transmission and reception of a plurality of wavetrains in a manner such as to be used for both synchronization and transmission of intelligence with the effect of transmitted intelligence on synchronization being minimized and with the effects of noise signal on transmission of intelligence being also minimized; and to the transmission of wavetrains on at least one carrier and preferably on a plurality of carriers of different frequencies to transmit energy in a generally uniformly distributed manner in a higher frequency range which may be as wide a range as may be advantageous, without affecting the form of the modulated wavetrains.

This invention contemplates other objects, features and advantages which will become more fully apparent from the following detailed description taken in conjunction with the accompanying drawings.

BRIEF DESCRIPTION OF THE DRAWINGS

FIGS. 1A and 1B together constitute a schematic block diagram of a transmitter system construction in accordance with the invention;

FIGS. 2A and 2B together constitute a schematic block diagram of a receiver system usable with the transmitter system of FIGS. 1A and 1B;

FIG. 3 is a schematic diagram of a circuit a synchronizing sequence generator of the receiver system of FIGS. 2A and 2B, a similar circuit being usable for other sequence generators of the transmitter and receiver systems of FIGS. 1A and 1B and FIGS. 2A and 2B;

FIG. 4 is a schematic diagram similar to FIG. 3 but illustrating a modified form of circuit;

FIGS. 9A and 9B together constitute a schematic block diagram of a transmitter unit of a system which incorporates a number of additional features of the invention;

FIGS. 10A and 10B together constitute a schematic block diagram of a receiver unit usable with the transmitter unit of FIGS. 9A and 9B;

DESCRIPTION OF PREFERRED EMBODIMENTS

Figure 1A:
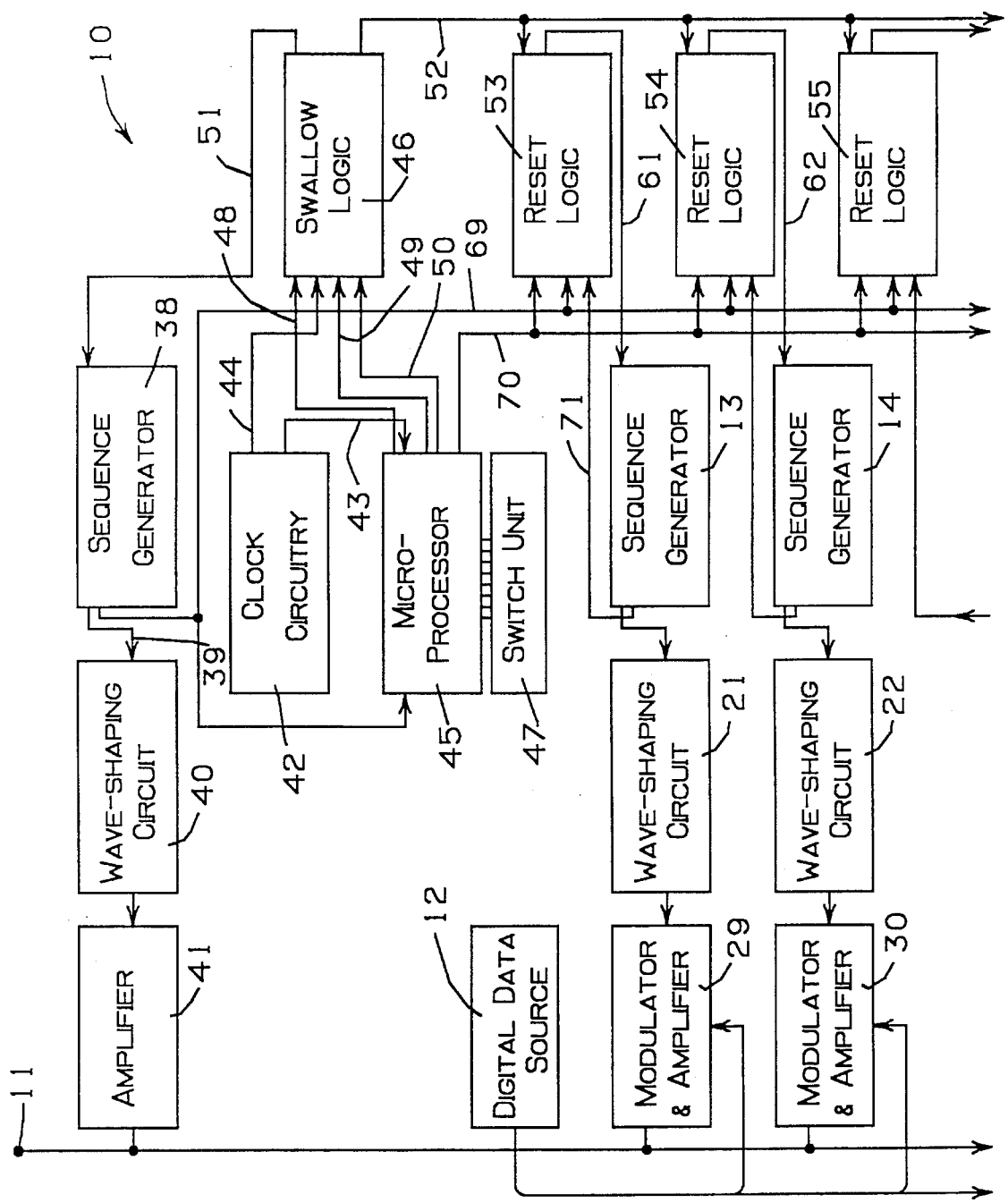
Figure 2B:
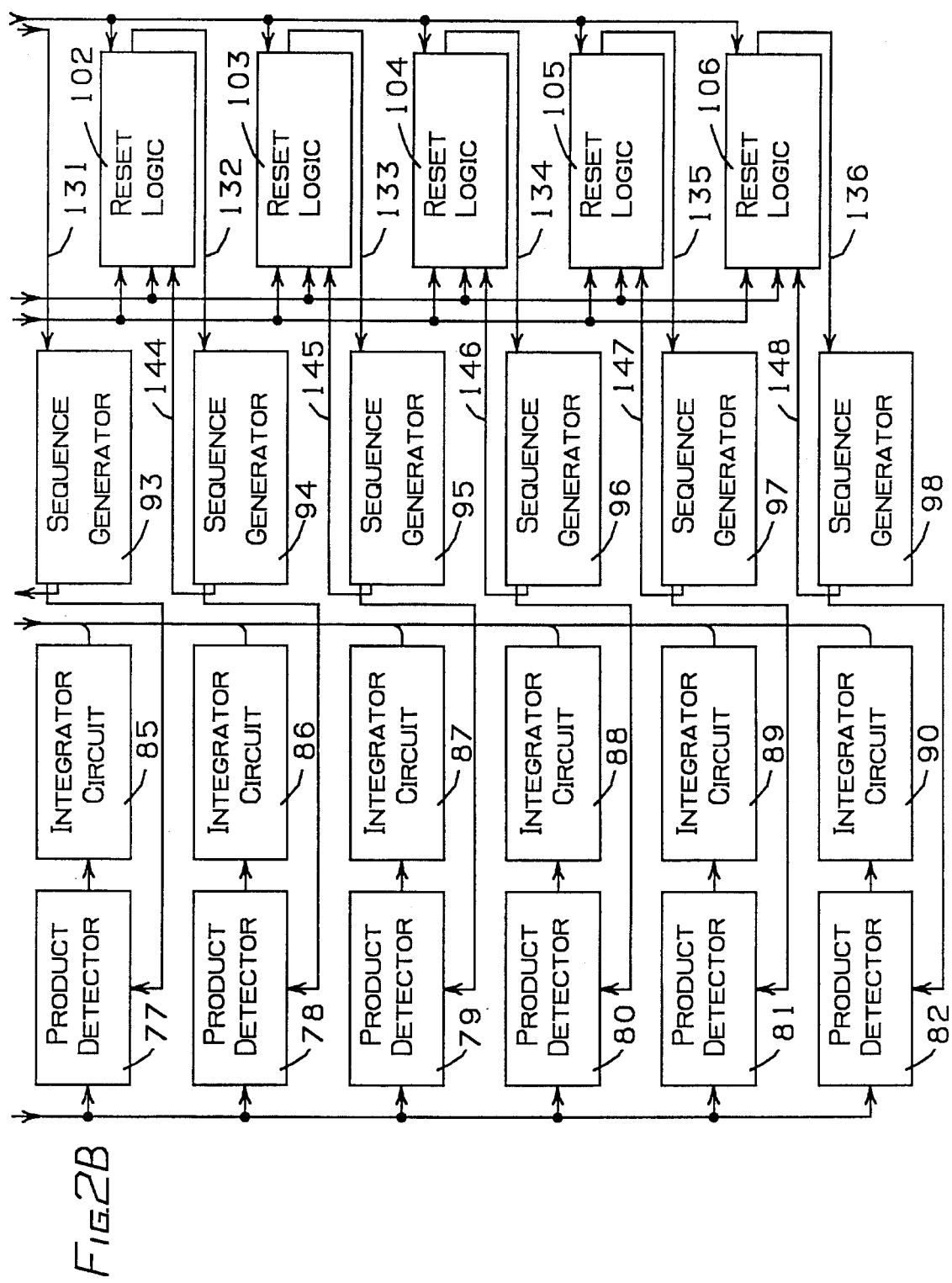

In FIGS. 1A and 1B, reference numeral 10 generally designates a transmitter which is constructed in accordance with the principles of this invention and which supplies RF energy to an output terminal 11 for propagation from an antenna, for example, and for detection by a receiver as shown in FIGS. 2A and 2B and described hereinafter. The illustrated transmitter 10 comprises eight intelligence transmitting devices for propagation of RF energy from the output terminal 11, such energy being simultaneously modulated by outputs of an eight bit digital data source 12, in a manner such as to effect a parallel transmission of such digital data. It will be understood that in place of transmission of digital data, each intelligence transmitting device may be used for transmission of an audio or video signal, or any other form of intelligence. Each may be coupled either to the same antenna or other propagation device used by other devices, as shown, or to a separate antenna or other propagation device, if desired.

The eight illustrated intelligence transmitting devices include eight sequence generators 13–20, eight wave-shaping circuits 21–28 and eight modulator and amplifier circuits 29–36. Eight reset logic circuits may also be included as described hereinafter. The sequence generators 13–20 are operated in synchronism, each generating a signal which is modified by the associated ones of the shaping circuits 21–28 and modulating circuits 29–36 to propagate a wavetrain from the output terminal 11 which is in the form of a sequence of variations having predetermined varying durations and in a predetermined pseudo-random order. Each of the sequence generators 13–20 develops a signal which is distinctively different from the signals developed by others of the sequence generators 13–20, in a manner such as to permit separate simultaneous detection by the receiver of FIGS. 2A and 2B as hereinafter described.

An important feature of the invention relates to the provision of a synchronizing signal transmitting device for simultaneous propagation of another wavetrain that is unmodullated and used solely for synchronizing purposes but which is similar to those propagated by the intelligence transmitting devices, having a predetermined pseudo-random order distinctively different from the orders of the variations of the wavetrains generated by the intelligence transmitting devices. In the illustrated transmitter 11, the synchronizing signal transmitting device includes a sequence generator 38 coupled through a line 39 to a wave-shaping circuit 40 which is coupled to the output terminal 11 through an amplifier 41.

For control of synchronized operation of all sequence generators, clock signals are applied from clock circuitry 42 and through lines 43 and 44 to a microprocessor 45 which is connected to a swallow logic circuit 46 and to a control switch unit 47. The swallow logic circuit 46 is connected to the microprocessor 45 through control lines 48, 49 and 50 and applies clock signals through a line 51 to the synchronizing device sequence generator 38 and through a line 52 to eight reset logic circuits 53–60. The effective frequency of such clock signals may be adjusted by manual control of the switch unit 47. Circuits 53–60 respectively control the application of clock signals through lines 61–68 to the intelligence device sequence generators 13–20 and are controlled by a terminal count output signal developed on an output line 69 of the synchronizing device sequence generator 38 and from a reset signal applied through line 70 from the microprocessor 45, the microprocessor being also connected to the output line 69 of the synchronizing device sequence generator 38. Reset logic circuit 53 also responds to signals applied through line 71 from the sequence generator 13 and reset logic circuits 54–60 respond to signals applied from associated intelligence device sequence generators 14–20.

As described in more detail hereinafter, the swallow logic circuit 46 is controlled by the microprocessor 45 and the switch unit 47 to periodically delete or "swallow" a cycles of the clock signal applied through line 44 from the clock circuit 42 and to develop clock signals on lines 51 and 52 of somewhat reduced average frequency. A similar cycle swallowing operation is performed at the receiver, but at the receiver an automatic control operation is provided such that the average frequency may be increased or decreased by decreasing or increasing the rate at which cycles are swallowed in a manner such as to obtain operation in the receiver at the same average clock frequency as in the transmitter even though the clock circuits of the transmitter and receiver are substantially different. The arrangement permits use of standard, relatively inexpensive clock circuits while obtaining accurately synchronized operation.

As also described in more detail hereinafter, each of the reset logic circuits 53–60 controls reset of the associated one of the intelligence device sequence generators 13–20. For example, the reset logic circuit 53 responds to a reset signal applied through line 70 from the microprocessor 45 to thereafter respond to a signal applied through line 71 from the sequence generator 13 when generator reaches a certain initial condition and to then temporarily cut off application of a clock signal through line 61 to the sequence generator 13. Then when the sequence generator 38 thereafter reaches a certain initial or reset condition a signal is applied through the line 69 to the reset circuit 53 which then restores the application of clock signals through line 61 to the sequence generator 13. Thus all sequence generators start in unison from the same initial condition.

FIGS. 2A and 2B constitute is a block diagram of a receiver 72 including an input terminal 73 which may be coupled to an antenna, for example, to receive a wavetrain propagated from the transmitter 10 of FIGS. 1A and 1B. Input terminal 73 is connected to the input of an amplifier 74 the output of which is connected to the inputs of eight intelligence receiving devices which include eight product detectors 75–82, eight integrator circuits 83–90, eight sequence generators 91–98 and eight reset logic circuits 99–106. The product detectors 75–82 receive input signals from the output of amplifier 74 and inputs signals from the sequence generators 91–98 to develop output signals which are the products of such input signals and wavetrains from the sequence generators. Such output signals are integrated by the integrator circuit and are applied to eight inputs of an output circuit 106. For detection of signals for the transmitter 10 of FIGS. 1A and 1B, the sequence generators 91–98 generate wavetrains which are the same as those generated by the sequence generators 13–20, with variations having the same predetermined varying durations and in the same predetermined pseudo-random orders.

The receiver 72 further includes a synchronizing signal receiving device which includes a product detector 109, an integrator circuit 110, a sequence generator 111 which is coupled through a line 112 to the product detector 109 and an analog-to-digital converter or ADC 113. The ADC 113 is coupled through a line 114 to the integrator circuit and through a line 115 to the sequence generator 111. The sequence generator 111 generates a wavetrain on line 112 having the same predetermined variations and same predetermined pseudo-random order as in the wavetrain generated by the synchronizing device sequence generator 38 of the transmitter. The product detector 109 receives an input signal from the amplifier 74 and the signal through line 112 from the sequence generator 111 to develop an output signal which is the product of such signals and which is integrated by the integrator circuit 110 and applied to the ADC 113. Through the line 115, the sequence generator 111 periodically develops a signal which is applied to a "read" input of the ADC 113 which then develops digital data corresponding to the amplitude of the analog signal applied from the integrator circuit 110.

Circuits similar to those of the transmitter 10 are provided in the receiver 72 for control of synchronized operation of all sequence generators. Clock signals are applied from clock circuitry 116 and through lines 117 and 118 to a microprocessor 120 and to a swallow logic circuit 122 which is connected to the microprocessor 120 through control lines 123, 124 and 125. The swallow logic circuit 122 applies a clock signal through a line 127 to the synchronizing device sequence generator 111 and through a line 128 to the eight reset logic circuits 99–106 of the intelligence receiving devices. Circuits 99–106 respectively control the application of clock signals through lines 129–136 to the intelligence device sequence generators 91–98 and are controlled by signals applied through lines 139 and 140 from the synchronizing device sequence generator 111 and from the microprocessor 120 and also by signals applied through lines 141–148 from the associated intelligence device sequence generators 91–98.

As described hereinbefore, the swallow logic circuit 46 of the transmitter is controlled by the microprocessor 45 to periodically delete or "swallow" a cycle of the applied clock signal and to develop clock signals of somewhat reduced average frequency for operation of the sequence generators of the transmitter. A similar cycle swallowing operation is performed at the receiver 72, but at the receiver 72 the average frequency may be increased or decreased by control of signals applied through lines 123, 124 and 125 from the microprocessor 120 to decrease or increase the rate at which cycles are swallowed in a manner such as to obtain operation in the receiver at the same average clock frequency as in the transmitter even though the clock circuits of the transmitter and receiver are substantially different. As aforementioned, the arrangement permits use of standard, relatively inexpensive clock circuits while obtaining accurately synchronized operation.

The microprocessor 120 is coupled to outputs of the ADC 113 and responds to the signal periodically developed by the sequence generator 111 on the line 115. The microprocessor circuit 120 thereafter periodically receives digital data corresponding to the amplitude of an analog signal applied from the integrator circuit 110 through line 114 to the ADC 113. The microprocessor in effect analyzes such digital data to determine when swallowing operations are appropriate and also when reset operations are appropriate.

Each of the reset logic circuits 99–106 is connected through a line 139 to an output of the sequence generator 111 and through a line 140 to the microprocessor circuit 120. As is described in more detail hereinafter, each of the reset logic circuits 99–106 is controlled in response to signals on lines 139 and 140 to control reset of the associated one of the intelligence device sequence generators 91–98. For example, the reset logic circuit 99 responds to a reset signal applied through line 140 from the microprocessor 120 to thereafter respond to a signal applied through a line 141 from the intelligence device sequence generator 91 when generator 91 reaches a certain initial condition and to then temporarily cut off application of a clock signal through line 129 to the sequence generator 91. Then when the synchronizing device sequence generator 111 thereafter reaches a certain initial or reset condition a signal is applied from through the line 139 to the reset circuit 99 which then restores the application of clock signals through line 129 to the sequence generator 91. Thus in the reset operation, all sequence generators of the receiver 72 start in unison from the same initial condition.

FIG. 3 is a schematic diagram of the synchronizing device sequence generator 111 of the receiver 72. With modifications as hereinafter described, the circuit of each of the sequence generators 13–20 and 38 of the transmitter 10 and each of the sequence generators 91–98 of the receiver 72 may be substantially the same.

The circuits as shown and described in detail are included in a prototype version which includes certain commercially available integrated circuits to which references are made herein to facilitate understanding of the construction and operation of the circuits. It should be understood that such references are not to be construed as limitations. It is also noted that through large scale integration techniques known in the art, a single integrated circuit can be designed to perform all of the functions of a number of the illustrated circuits, to reduce the size and cost of transmitters and receivers of the invention which are manufactured in quantity.

The sequence generator 111 comprises an EPROM 150 which may be a type 27C256 EPROM having 15 address inputs and 8 outputs and capable of storing 262,144 bits (32 k×8) and which may be used for storage of 128 digital codes each usable for generation of a sequence of 256 signal variations to form a wavetrain, the variations having varying durations and a pseudo-random order determined by the digital code.

In the circuit as shown, eight of the 15 address inputs of the EPROM 150 (A0–A7) are connected through a bus 151 to eight outputs of an eight bit binary counter 152 which operates as an address counter to cause the EPROM 150 to output 256 data bytes during each cycle of operation thereof. Counter 152 may be a type 74F269 bidirectional counter which is set for a full count operation through connection of all parallel data inputs to ground and for an up counting operation through connection of a U/D pin through line 153 to the +V supply. The remaining seven address inputs (A8–A14) of EPROM 150 are connected through a bus 155 to a code select switch unit 156 containing seven pull-down resistors and seven manually operable switches by which the seven address inputs may be selectively connected to a +V voltage supply as indicated, to thus select from among the aforesaid 128 digital codes, each containing 256 data bytes.

Eight output pins of the EPROM 150 are connected through a bus 157 to eight parallel data inputs of a counter 158 to which clock pulses are supplied from the swallow logic circuit through the line 127. Counter 158 may be a type 74F269 bidirectional counter and is set for a down-counting operation with a U/D pin thereof connected through line 159 to ground. A terminal count pin of counter 158 is connected to a line 160 which is connected directly to a line 161 connected to a parallel enable input of counter 158. When the counter 158 counts down to a zero count, the terminal count pin is brought low to bring the parallel enable input low and to load a count into counter 158 as determined by the data byte then supplied by the EPROM 150.

The terminal count pin of counter 158 is also connected through the line 160 to a clock input of a flip-flop 162 which may be one-half of a type 74F114 dual JK negative edge-triggered flip-flop (the other half may be used for another sequence generator of the receiver). A Q output of the flip-flop 162 is connected to a line 163 which is connected to a clock input of the counter 152. A Q-not output of flip-flop 162 is connected to the line 112 which is connected to one input of the product detector 109, as shown in FIG. 2A. The Q-not output of flip-flop 162 is also connected to J and K inputs thereof, the flip-flop 162 being triggered to an opposite state in response to each negative-going transition at its clock input.

During each cycle of operation of the counter 152, it develops a terminal count pulse at a terminal count output pin which is connected to the line 139 to perform a reset operation as hereinafter described. The terminal count pulse so developed might also be used for control of the microprocessor 120 as well as the ADC 113 and, in fact, the terminal count pulse of the corresponding counter of the sequence generator 38 of the transmitter 10 is so used, being connected to the line 69 which is connected to the microprocessor 45 as well as the reset logic circuits 53–60. FIG. 3 shows a decode circuit 165 which may optionally be provided for applying a pulse through line 115 to the microprocessor 120 and ADC 113 at a certain time during each cycle of operation of the counter 152. The decode circuit may be a type 74F138 integrated circuit with a Q0 output connected to line 115 and with A0, A1, A2, E1 and E2 inputs connected to Q3–Q7 outputs of the counter 152 which is preferably a type 74F269 counter.

Appendix A contains listings of examples of codes which may be stored in the EPROM 150 and in the EPROMs of other sequence generators of the transmitter 10 and receiver 72. In the following description of the operation of the sequence generator 111, it is assumed that the codes stored in the EPROM 150 and the setting of the switch unit 156 is such that a 256 byte code is accessed during sequential counts of the address counter 152 as set forth in hexadecimal and decimal forms in Tables I and II of Appendix A.

With counter 152 in a reset condition to apply the data byte 00000000 to address pins A0–A7 of EPROM 150, the first byte of Tables I and II (hex. 0B, decimal 11 or binary 00001011) is then output from EPROM 150. It may also be assumed that the terminal count output of the counter 158 (line 160) has just been brought to a low state to reset the flip-flop 162 and to bring the parallel enable input of the counter 158 (line 161) to a low state and to thereby load the same number in the counter 158.

In response to application of clock pulses through line 127 to the clock input of counter 158, the counter 158 then counts down from 11. When the count reaches zero, the terminal count output of counter 158 (line 160) is again brought low, loading the same number (decimal 11) in the counter 158 and allowing it to again count down from 11 in response to subsequent clock pulses applied through line 127. At the same time, the flip-flop 162 is triggered to bring the Q output thereof to a high state with a rising edge being applied through line 163 to the counter 152 to increment the count thereof and to apply a new address byte 00000001 to the EPROM 150 which may thereafter output the second byte of Tables I and II, which is 1D hexadecimal or 29 decimal. When the counter 158 thereafter completes its count down the second time from 11 to zero, the flip-flop 162 will be reset, the decimal number 29 will be loaded into the counter 158 which will thereafter effect two consecutive count-downs from 29 to 0.

In the operation as thus far described, the Q-not output of flip-flop 162 that is connected to the output line 112 is high during the first count-down of counter 158 from 11 to 0, low during the second count-down from 11 to 0, high during the first count-down from 29 to 0 and low during the second count-down from 29 to 0. In response to clock pulses thereafter applied through line 127, the durations of the two consecutive low and high states of the Q output of flip-flop 162 are controlled by the data bytes stored in the consecutive address locations of the EPROM 150, as listed in Tables I and II of Appendix A. After the full-count condition is reached, the sequence is repeated.

It is noted that in Tables I and II, as well as in Tables III and IV, the 256 bytes in each table are in twelve groups of 20 plus a final group of 16. Each of such 12 groups of 20 has a range of 20 values from 0B to 1E hexadecimal (11 to 30 decimal), arranged in a pseudo-random order. The 16 bytes of the final group are also in a pseudo-random order and they have decimal values of 30 or less, except that the next to the last byte has a value of 50 hex. or 80 dec. for the purpose of obtaining a terminal count from the counter 152 which is of extended duration, as is desirable when the terminal count output is used for control of the microprocessor 45, as is shown in FIG. 1A, and as may be desirable if the terminal count output of counter 152 is used in place of the output of the decode circuit 165 for application to the microprocessor 120 and ADC 113.

It is further noted that in the synchronizing code of Tables I and II for the receiver, and also in the intelligence codes for both the receiver and transmitter, the total of the values of each of 12 groups of 20 in the first 240 bytes is 410 and the total for the 12 groups 4920. The total of the values in the final group of 16 bytes in the synchronizing code for the receiver is 334 making a total for all values of 5254. An important feature is that this total may be different from the totals for the synchronizing code for the transmitter and for the intelligence codes for both the transmitter and receiver, all of which may preferably be the same. For example, as indicated in Tables I and II of Appendix A, the third from the last byte for the synchronizing code for the receiver has a decimal value of 16, compared with a decimal value of 18 for the corresponding byte of the synchronizing code of the transmitter, which is otherwise the same as for the receiver. Thus the total for all values in the transmitter code is 5256, two more than the total of 5254 for the receiver code, and since there are two count-downs of the counter 158 for each byte of the code, the total number of clock cycles in each complete transmitter synchronizing sequence is 10,512 compared to 10,508 for the receiver sequence. The result is a continual phase advance of the receiver synchronizing sequence generator 111 in relation to other sequence generators of the receiver and transmitter, equal to four clock cycles for each complete sequence. This feature is useful in synchronizing operations as hereinafter described.

FIG. 4 illustrates a modified form of sequence generator 166 by which a much longer sequence may be readily generated, using 16 groups of codes of 256 bytes each, for a total of 4096 codes. The generator 166 uses many of the components of the signal generator 111 of FIG. 3 but the decode circuit 165 of FIG. 3 is not used and the switch unit 156 of FIG. 3 is replaced by the combination of a four-bit counter 167 and a switch unit 168. The three highest of seven high order address lines of the EPROM 150 are connected to the switch unit 168 and the other four of the seven high order address pins of the EPROM 150 being connected to outputs of the counter 167. The counter 167 may be a type 74F161 counter with a clock input thereof being connected through a line 169 to the terminal count output pin of the counter 152. A line 170 is connected to the terminal count output pin of the counter 167 and may be connected to the line 115 as well as the line 139 in FIG. 2 when the sequence generator 166 in place of the synchronizing sequence generator 111 of the receiver 72 of FIGS. 2A and 2B. When used as the synchronizing device sequence generator 38 or when used as one of the intelligence device sequence generators 13–20 or 91–98 of FIGS. 1A and 1B or 2A and 2B, the line 170 may be connected to line 69, the line 71 connected to sequence generator 13 or one of the lines corresponding to line 71 and connected to sequence generators 14–20 or one of the lines 141–148 (FIGS. 2A and 2B).

Figure 5A:
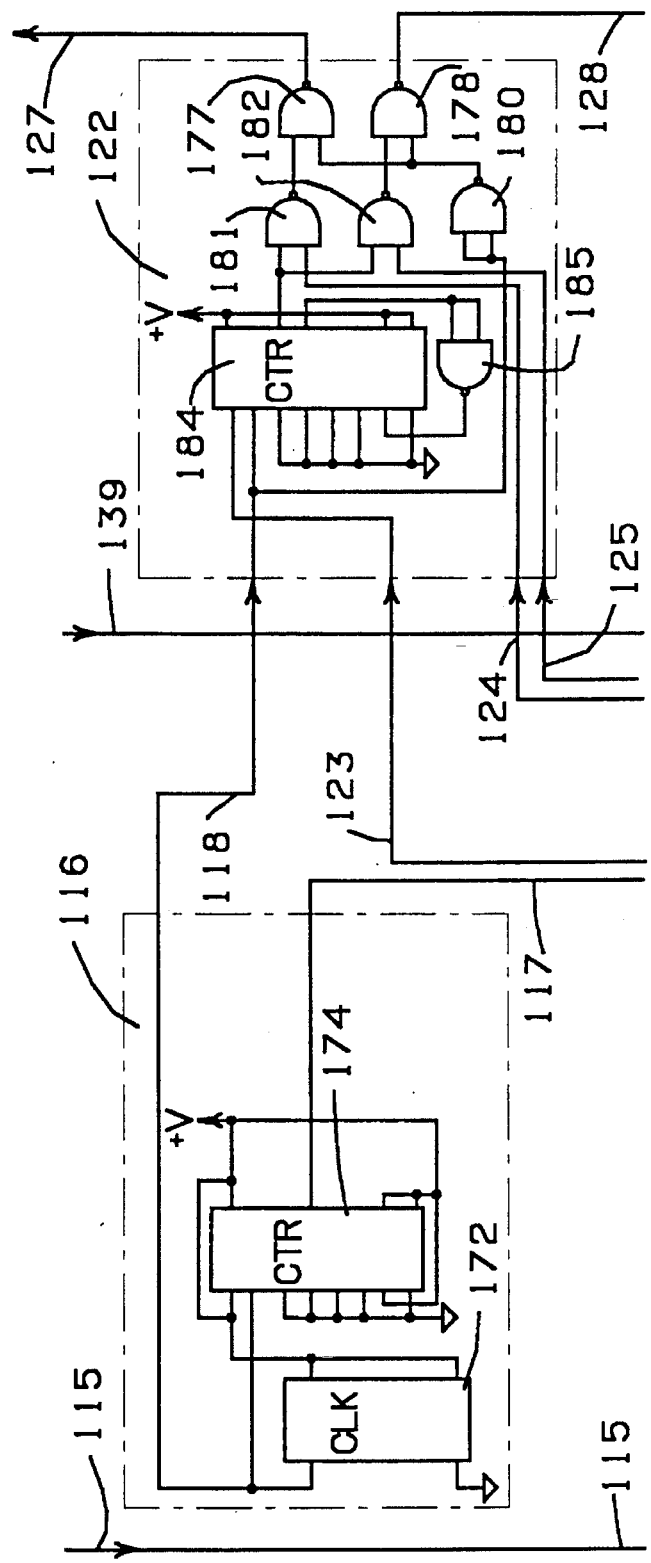
FIGS. 5A and 5B together constitute a schematic diagram illustrating circuits and connections of a reset logic circuit, an ADC, clock circuitry, microprocessor and swallow logic circuitry of the receiver system of FIGS. 2A and 2B.
Figure 5B:
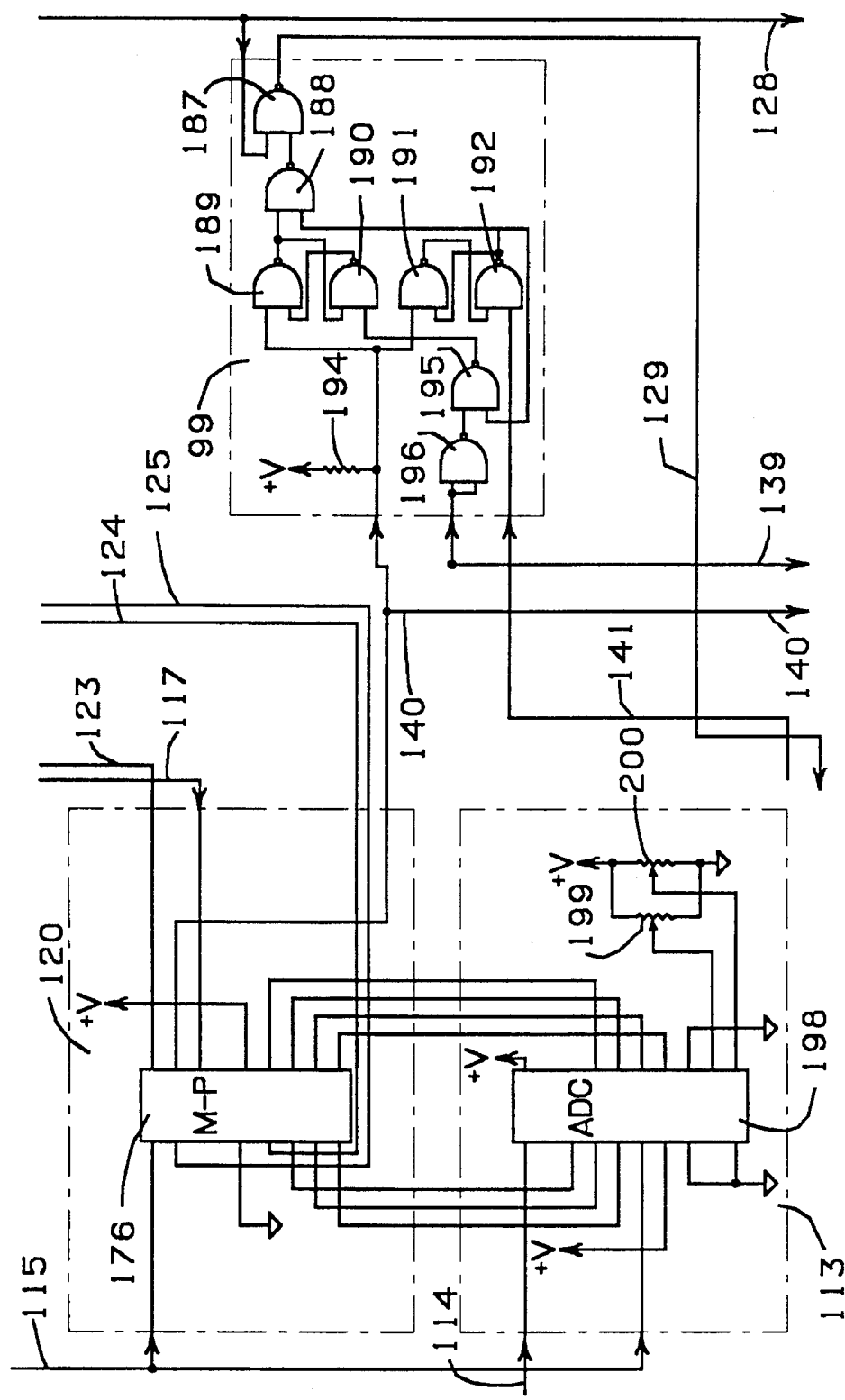

FIGS. 5A and 5B illustrate circuits and connections of the reset logic circuit 99, the ADC 113, the clock circuitry 116, the microprocessor 120 and the swallow logic circuit 122 of the receiver 72 of FIGS. 2A and 2B. Except for the ADC 113, similar circuits are usable for the reset logic circuit 53, clock circuitry 42, microprocessor 45 and swallow logic circuit 46 in the transmitter 10 of FIGS. 1A and 1B.

The illustrated clock circuitry 116 comprises a crystal controlled clock oscillator 172 which may have an output frequency of 32 MHz and which may be a relatively inexpensive type of unit such as a type MX045 CTS clock oscillator having a frequency tolerance of plus or minus 100 PPM. The output of oscillator 172 is connected through line 118 to the swallow logic circuit 122 and is also connected to the clock input of a counter 174 which may be a type 74F161 counter and which operates as a divider to supply through line 117 a 8 MHz clock signal to the microprocessor circuit 120.

The microprocessor circuit 120 comprises a microprocessor 176 which may be a PIC16C54 microprocessor having 12 ports each of which is selectively operable as either an input port or an output port. Eight of such ports are operative as input ports, one input port being connected to line 115 and seven input ports being connected to outputs of he ADC circuit 113. Four ports operated as output ports are connected to the lines 123, 124, 125 and 140.

The swallow logic circuit 122 is operative under control of signals applied through lines 123, 124 and 125 from output ports of the microprocessor 176 to selectively swallow or delete cycles of clock signals applied through lines 127 and 128 to the synchronizing device sequence generator 111 or through reset circuits 99–106 to the intelligence device sequence generators 91–98. The lines 127 and 128 are connected to outputs of two NAND gates 177 and 178 having inputs which receive inverted clock pulses from the output of a NAND gate 180, clock pulses being supplied to both inputs of NAND gate 180 from the clock circuit 116 through line 118. Second inputs of the NAND gates 177 and 178 are connected to outputs of two NAND gates 181 and 182 which control swallowing of clock cycles and which have inputs connected through the lines 124 and 125 to outputs of the microprocessor circuit 120.

Lines 124 and 125 are normally low, so that the outputs of NAND gates 181 and 182 are normally high and so that the NAND gates 177 and 178 normally operate to develop output clock pulses which are applied through the lines 127 and 128 to the synchronizing sequence generator 111 and through the reset logic circuits 99 to 106 to the sequence generators 91–98. To control swallowing of single clock cycles, a counter 184 is provided which is preferably a 74F161 counter and which has a Q0 output connected to second inputs of the NAND gates 181 and 182 and a Q1 output connected to a count enable parallel input thereof through a NAND gate 185 which operates as an invertor. Normally, the counter 184 is in a holding state in which the Q1 output is high to bring the count enable parallel input low and to prevent counting by the counter 184 until reset. A clock input of counter 184 is connected through line 118 to the output of oscillator 172 of the clock circuit 116. A master reset of the counter 184 is connected through line 123 to an output port of the microprocessor 176 to be brought low to reset the counter 184 and to be then be brought high to allow counting by the counter until reaching the aforesaid holding state in which the Q1 output is high. During such counting, a single pulse is developed at the Q0 output of counter 184 which is high for the duration of one clock cycle and which is accurately synchronized with the clock signal applied from line 118, even though the timing of the reset pulse applied from line 123 may be indeterminate.

To swallow a clock cycle which might otherwise be applied through lines 127 and 128 to the sequence generator 111 and the reset logic circuits 99–106, a high signal is applied from the output ports of the microprocessor 176 and through both lines 124 and 125 to inputs of both NAND gates 181 and 182, with no immediate effect on the outputs of the NAND gates 181 and 182, the other inputs thereof being normally low. Then a signal is applied from the microprocessor 176 through line 123 to bring the master reset line of the counter 184 from a high state to a low state to reset the counter 184 and then back to a high state to allow counting until the aforesaid holding state is reached, thereby applying a single pulse to the NAND gates 181 and 182 which is high for the duration of one clock cycle. As a result, the outputs of NAND gates 181 and 182 are brought low for one clock cycle, forcing the outputs of NAND gates 177 and 178 to a high state for one clock cycle and, in effect, swallowing or deleting one clock cycle.

The arrangement permits selective swallowing of cycles applied to lines 127 and 128 through control by the microprocessor 176 of signals applied to lines 124 and 125 to control NAND gates 181 and 182. As hereinafter described, NAND gates 181 and 182 are normally operated in unison to periodically delete pulses for the purpose of obtaining an average frequency of clock pulses applied to both the synchronizing sequence generator 111 and the intelligence sequence generators 91–98. When searching for an exactly synchronized condition, as hereinafter described, a high signal may be applied at certain times on line 124 alone to use only the NAND gate 181 and to delete one or more clock cycles applied through line 127 to the synchronizing sequence generator from the output of the NAND gate 177.

The swallow logic circuit 46 of the transmitter 10 may be identical to the swallow logic circuit 122 as shown in FIG. 5A, but it is possible to use a simpler construction in which clock pulses are applied at the same frequency to the synchronizing device sequence generator 38 and to the intelligence devices sequence generators 13–20. Thus, for example, gates corresponding to NAND gates 178 and 182 may be eliminated in the swallow logic circuit 46 of the transmitter 10, along with control line 50 which corresponds to control line 125, and both lines 51 and 52 may be connected together and to a gate which corresponds to gate 177 of the circuit 122 shown in FIG. 5A.

The reset circuit 99 comprises a NAND gate 187 which has one input connected to receive clock pulses through the line 128 from the swallower circuit 122 and which has an output connected to line 129 to normally supply clock pulses to the sequence generator 91, a second input of NAND gate 187 being connected to the output of a NAND gate 188 which is normally in a high state. A reset operation is performed in response to a signal applied through line 140 from the microprocessor 176 and is effected through control of the NAND gate 188 to temporarily discontinue supply of clock pulses to the line 129 when a terminal count pulse is applied from the sequence generator 91 through line 141 and to thereafter continue application of clock pulses to the line 129 when a terminal count pulse is applied through line 139 from the sequence generator 111.

To perform the reset operation, two latch circuits are provided, an upper latch being formed by a pair of NAND gates 189 and 190 and a lower latch being formed by a pair of NAND gates 191 and 192, the output of each NAND gate of each pair being connected to an input of the other NAND gate of the pair. The output of the upper NAND gate 189 of the upper latch and the output of the lower NAND gate 192 of the lower latch are connected to inputs of the NAND gate 188 the output of which is connected to one input of the NAND gate 187. Inputs of both of the upper NAND gates 189 and 191 are connected to the line 140 from the microprocessor 176 and through a pull-up resistor 194 to the +V supply. An input of the lower NAND gate 190 of the upper latch 190 is connected to the output of a NAND gate 195 which has one input connected to the output of the lower NAND gate 192 of the lower latch. A second input of NAND gate 195 is connected to the output of a NAND gate 196 which has both of two inputs thereof connected to the terminal count line 139 from the sequence generator 111.

Normally both latches are reset and the output of the upper NAND gate 189 is low so that the output of NAND gate 188 is high to allow transmission of clock pulses through NAND gate 187. The microprocessor may set both latches simultaneously by bringing the line 140 from a high state to a low state and back to a high state. When both are latches are set, the output of NAND gate 192 is in a low state, placing the output of NAND gate 188 and thereby one input of NAND gate 187 in a high state to allow transmission of clock pulses to the line 129. At this time, also, the output of NAND gate 195 is held in a high state, preventing reset of the upper latch circuit which might otherwise occur in response to a terminal count signal applied from the sequence generator 111 and through NAND gate 196 to the NAND gate 195.

When, thereafter, the sequence generator 91 reaches a reset condition, a terminal count output of the sequence generator 91 brings line 141 to a low state to bring the output of the lower NAND gate 192 to a high state and to reset the lower latch circuit. At this time, both inputs of NAND gate 188 are high, its output is low and the output of NAND gate 187 is held in a high state to preclude transmission of clock pulses to the line 129. The sequence generator 91 is then held in a reset condition. However, with the output of NAND gate 192 in a high state, one input of NAND gate 195 is in a high state and the upper latch can be reset in response to a terminal count output of the sequence generator 111 applied through line 139 to bring the output of NAND gate 196 to a high state and to thereby bring the output of NAND gate 195 and one input of the lower NAND gate 190 to a low state.

At this time, both latches are reset and the circuits are restored to the initial condition, such that clock pulses and again be transmitted through NAND gate 187 and line 129 to the sequence generator 91. Thus the sequence generator 91 resumes operation from a reset condition substantially simultaneously with the continued operation of the sequence generator 111 from its reset condition. It will be understood that all of the reset logic circuits 99–106 have the same circuitry, so that all may be allowed to go to a reset condition and to then be restarted simultaneously with the operation of the sequence generator 111.

To determine the times for effecting cycle swallowing operations and reset operations, the microprocessor 176 is programmed to monitor the output of the integrator circuit 110 through the ADC circuit 113 which includes an ADC 198, preferably an ADC such as a type ADC0820 which is a 8-bit high speed converter with a track/hold function. In the circuit as shown, an analog voltage input pit of the ADC is connected through the line 114 to the output of the integrator circuit 110 and all but the least significant data output pins of the ADC 198 are connected to input ports of the microprocessor 176. The output line 115 from the sequence generator 111, at which a timing signal is periodically generated, is connected to a WR/RDY pin to start a conversion of analog to digital data, the digital data being valid at a certain time after the rising edge of the applied timing signal. Voltage reference pins of the ADC are connected to the adjustable contacts of a pair of potentiometers 199 and 200 which are connected between ground the +V supply.

Figure 6:
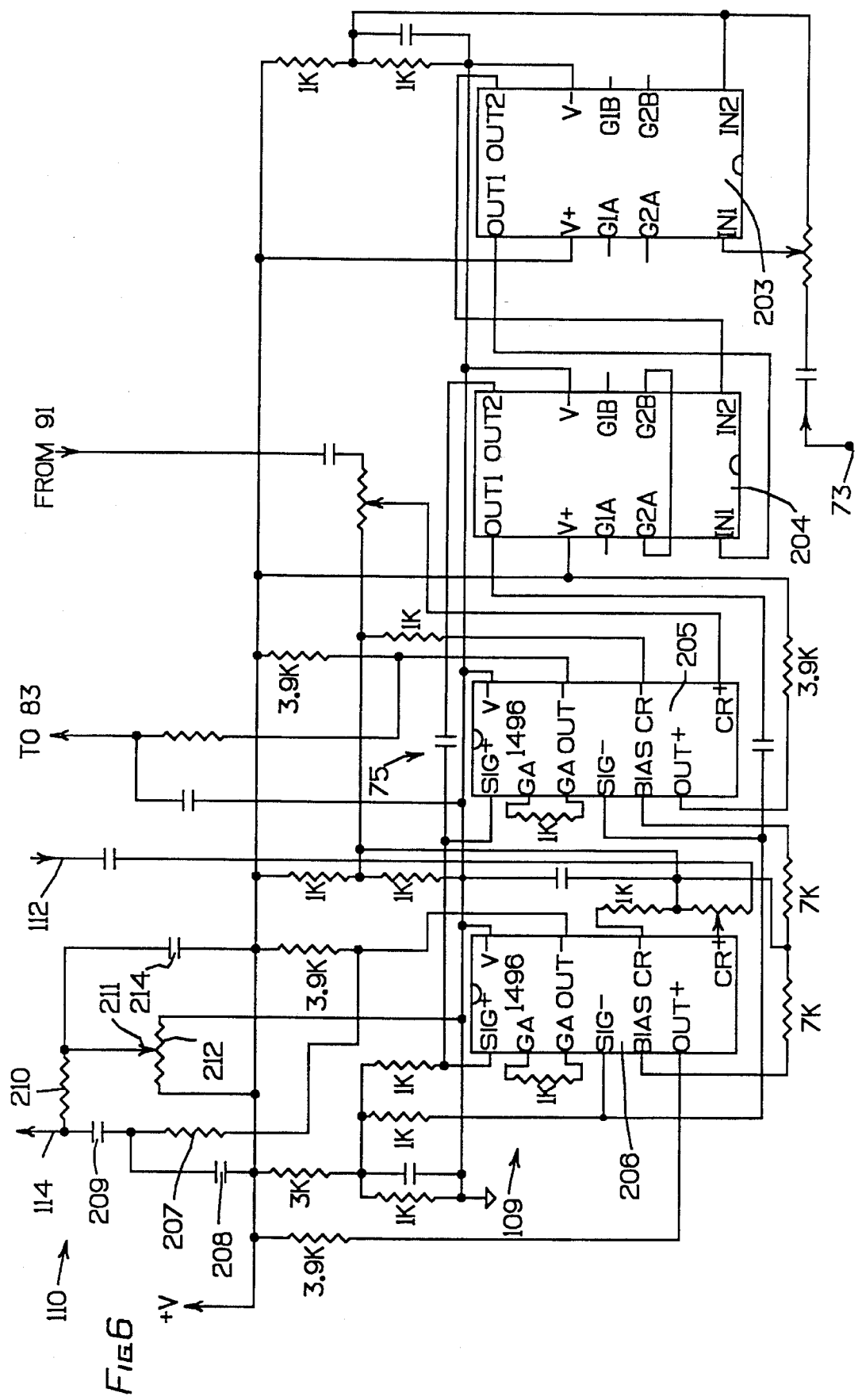
FIG. 6 is a circuit diagram illustrating amplifier, product detector an integrator circuits usable in the receiver system of FIG. 2A and 2B.

FIG. 6 illustrates circuitry usable for the amplifier circuit 74 which comprises a pair of serially connected type 733 integrated circuit video amplifiers 203 and 204 receiving a signal from the input terminal 73 and coupled to a type 1496 integrated circuit 205 of the intelligence device product detector 75 and another type 1496 integrated circuit 206 of the synchronizing device product detector 109. The circuits are connected to resistor, capacitor and potentiometer components which have values and which are interconnected with one another and to a voltage supply in the manner as shown, the voltage supply being preferably a +12 volt supply. The integrator circuit 110, shown in block form in FIG. 2A, may be formed by the simple combination of a resistor 207 and a capacitor 208, having a time constant of the same order of magnitude of or somewhat greater than the duration of one sequence of operation of the sequence generator 111, which may be on the order of about 300 microseconds under conditions assumed herein. The output of the integrator circuit is connected through a DC blocking capacitor 209 to the output line 114 which is connected through a resistor 210 to a movable contact 211 of a potentiometer 212 connected between ground and a +V supply line. The movable contact 211 is connected through a capacitor 214 to ground and is adjustable to adjust the DC level of the analog signal applied to the ADC 114.

Figure 7:
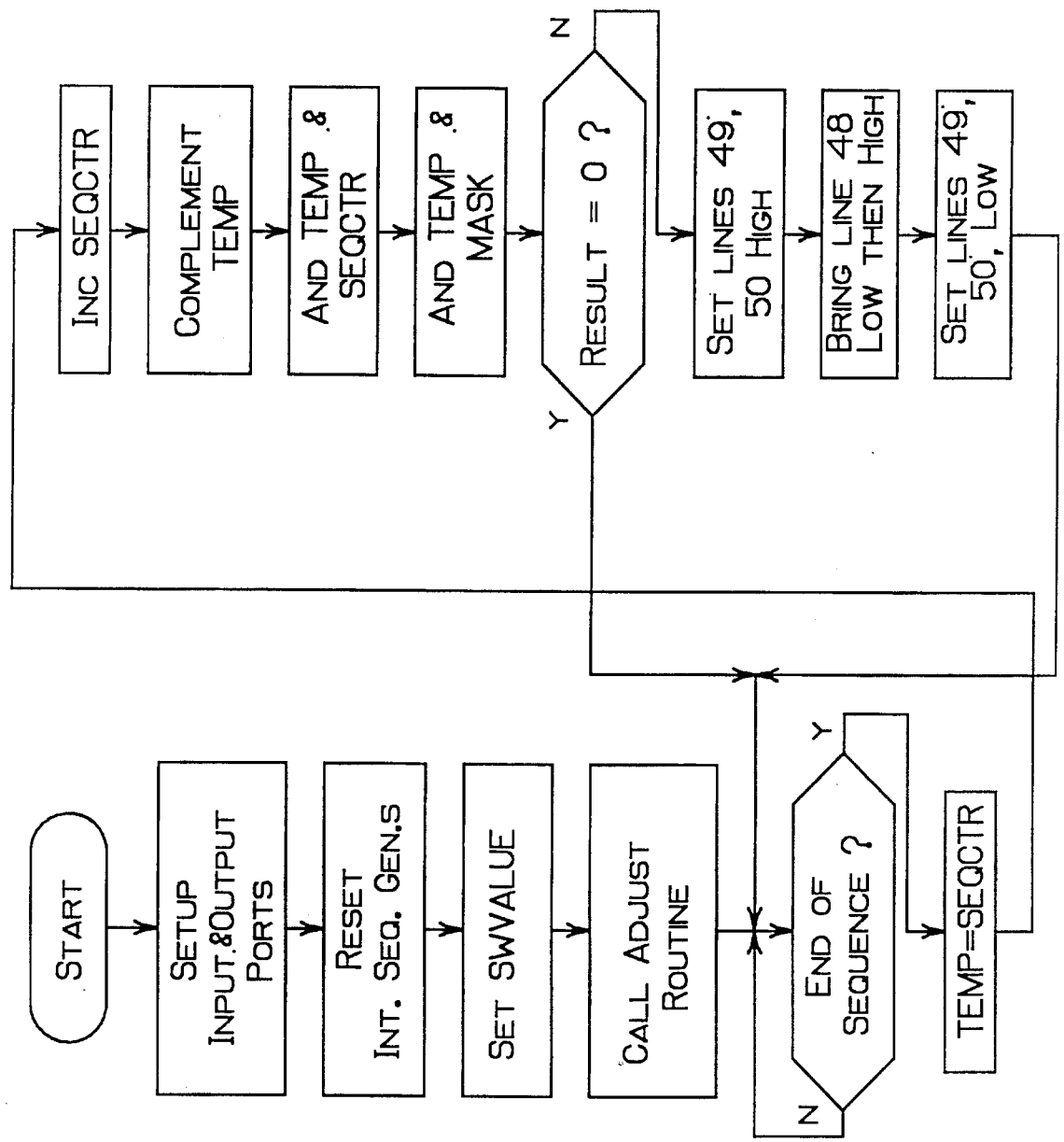
FIG. 7 is a flow chart illustrating the operation of a microprocessor of the transmitter system of FIGS. 1A and 1B.

FIG. 7 is a flow chart showing the operation of the microprocessor 45 of the transmitter 10 in which the circuits of the microprocessor 45, clock 42, swallow logic circuit 46 and reset logic circuit 53 may be similar to the circuits 120, 116, 122 and 99 of the receiver 72 as shown in FIGS. 5A and 5B. Thus lines 43, 44, 48, 49, 50, 69 and 70 in FIG. 1A respectively correspond to lines 117, 118, 123, 124, 125, 139 and 140 in FIGS. 2A and 2B and 5A and 5B. A source code listing for certain routines associated with cycle swallowing and used in the operation of the microprocessor 176 and that of the transmitter are set forth in Appendix B hereto. Lines 8–17 of the listing define names used. Lines 23–44 relate to setup operations. Lines 46–61 relate to an "adj" operation in which the twelve lowest bits of a swallow value ("svl" and "svh") are reversed and placed in a mask value ("masl" and "mash"). Lines 62–91 relate to a "revo" subroutine which is used in the "adj" routine to reverse bits of four bit nibbles. Lines 143–146 relate to a swallow operation performed after each increment of a sequence counter, according to a comparison of bits of a mask value with a bit changed in such increment of the sequence counter.

After power-up, initial setup operations are performed including instructions to make appropriate ports for input and output and the clearing of various registers, including registers named "SEQCTR" in the flow chart of FIG. 7 and named "scl" and "sch" in the source listing, for keeping a count of the number of sequences performed by the synchronizing sequence generator 38 of the transmitter 10, after clearing thereof.

A value named "MASK" in the flow diagram and "masl" and "mash" in the source listing is used in performing swallows or deletions of cycles for control of frequency in the transmitter. As illustrated in FIG. 7, instructions are included which are optional and by which a swallow value named "SWVALUE" may be set at a certain binary value of such as 0000100000000000, for example, as by determining the positions of contacts of switches of the switch unit 47 which are connected to input ports of the microprocessor 45. A routine named "Adjust" is then called (lines 46–61 of the Source listing) to reverse the order of 12 lowest order bits of SWVALUE and store them in the 12 lowest order bits of the MASK value, which may thereby have a corresponding binary value, e.g. 0000000000000001.

As an alternative to using the SWVALUE and the "Adjust" routine, the MASK value may be simply set equal to 0000000000000001, or any other desired value, which may be a value set by the microprocessor program or which may be read from the positions of switches of the switch unit 47 connected to input ports of the microprocessor 45. The use of SWVALUE and Adjust routine are particularly desirable in case it is desired to perform arithmetic for setting of frequency and they are used for this purpose in the receiver, for controlling frequency and in performing scanning operations, as hereinafter described.

It is noted that "SEQCTR", "SWVALUE", "MASK" and a number of other values which are given single names in the flowchart actually require two bytes with separate names in source code listings for the relatively simple 8 bit PIC16C54 microprocessor, as set forth in Appendix B hereto. For example, and as has been noted, the sequence counter value "SEQCTR" is formed by low and high order bytes given the names "SCL" and "SCH" in such listings.

After setup operations, a test is made for the end of a sequence of operation of the synchronizing sequence generator 38. This test is made in the illustrated embodiment by monitoring the terminal count output line 69 from the sequence generator 38, which corresponds to the output line 114 of the sequence generator 111 of the receiver (FIGS. 5A and 5B), to determine when it brought from high to low and then back to high.

When the terminal count is detected, the sequence count value is temporarily stored as a TEMP value, after which the SEQCTR is incremented. Then TEMP is complemented and a logical AND operation is performed on TEMP and SEQCTR. The result is a value which shows the position of a single bit which was changed from incrementing SEQCTR and which is compared with the MASK value, through a logical AND operation, to determine whether a swallow operation should be performed.

An important feature is that within the limits of the number of bits of the MASK value which are used, any desired number of cycles can be swallowed which are generally uniformly distributed over a period of time, to produce a gradual shift in phase-frequency. This may be clarified by the following example in which the MASK value is assumed to be:

0000000000000001 and the sequence count value SEQCTR is:

0000000000001011

When TEMP is set equal to SEQCTR and then complemented, the result is:

1111111111110100

If SEQCTR is now incremented, the result is

0000000000001110

A logical AND of the last two values yields:

0000000000000100

A logical AND of this value and the MASK value yields a zero, and no swallowing operation is performed. However, after the next sequence, SEQCTR is equal to:

0000000000001110

When TEMP is set equal to SEQCTR and then complemented, the result is:

111111111110001
If SEQCTR is now incremented, the result is
0000000000011101
A logical AND of the last two values yields:
00000000000000001
A logical AND of this value and the MASK value now yields a 1, and a swallowing operation is performed. Thus if the least significant bit of the MASK value is a 1, a swallowing operation is performed in the second sequence of the above example, and, if the example were continued in fourth, sixth, eighth, etc. sequences thereafter, i.e. every other cycle. If the MASK value had been 0000000000000101, a swallowing operation would also have been performed in the first sequence of the foregoing example, and if the analysis were continued, would be performed in the ninth, seventeenth, and every eighth sequence thereafter. If the MASK value had been 0000000000000111, a swallowing operation would also had been performed in the third, seventh, eleventh, fifteenth and every fourth sequence thereafter.

Each bit of the MASK value produces a unique series of sequences in which swallowing operations are performed at uniformity spaced times. Thus within the limits of the number of bits of the MASK value which are used, any desired number of cycles can be swallowed which are generally uniformly distributed over a period of time, to produce a gradual shift in phase-frequency.

The advantages of this arrangement may be further clarified by considering the operation of a representative system in which crystal controlled clock oscillators are used each having a nominal frequency of 32 MHz and in which codes are used as set forth in Tables I–IV of Appendix A. In this case, the total for all byte values in the code used for the sequence generator 38 of the transmitter is 5256 and the total for all byte values used for the sequence generator 111 of the receiver 72 is 5254. Since there are two count-downs of the counter 158 of the sequence generator 111 of the receiver for each byte of the code, the total number of clock cycles in each complete transmitter synchronizing sequence is 10,512 compared to 10,508 for the receiver sequence. There is thus a four clock cycle phase advance at the end of each sequence of the synchronizing sequence generator 111 of the receiver 72, and it requires 2628 sequences (10,512 divided by 4) to go through all possible phase positions and effect a complete scanning operation as hereinafter described.

If there is an error of 50 PPM (parts per million) in the receiver clock frequency relative to that of the transmitter clock frequency, it is equivalent to a error during one sequence of less than one-half of the duration of one clock cycle. This might be quite acceptable if it were possible to correct the phase at the end of each sequence, but there are problems in attempting to do so. If it were possible to correct the phase at the end of each sequence or even after a small number of sequences, there is the potential problem that the phase correction system will attempt to lock in on a signal which is not at the proper phase but which may have sufficient power, at least on a temporary basis, to cause the system to attempt to lock in on the signal.

Figure 8:
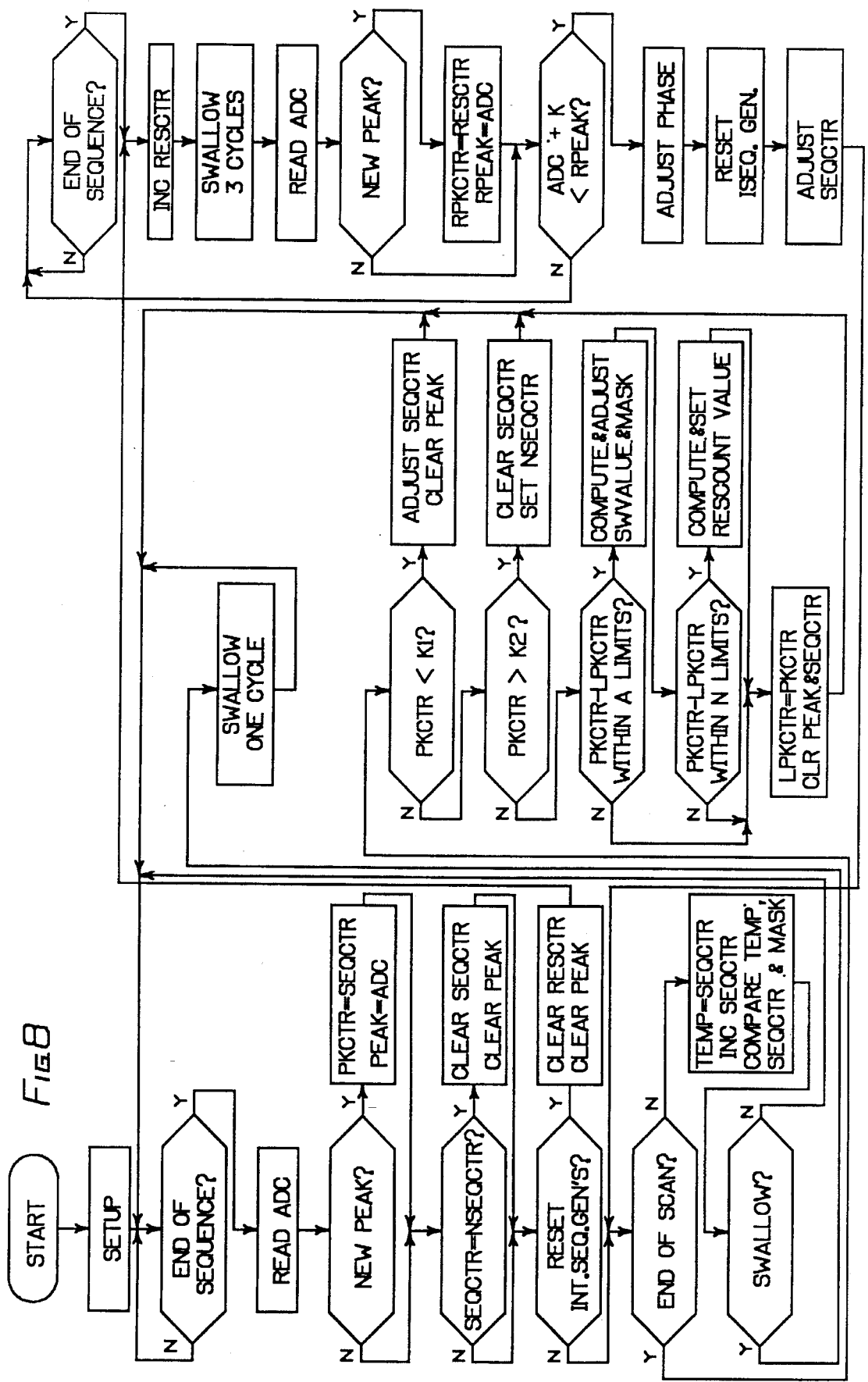
FIG. 8 is a flow chart illustrating the operation of a microprocessor of the receiver system of FIGS. 2A and 2B.

In a system of this invention using the flow diagram of FIG. 8, provision is made for continually effecting complete scanning operations to determine the phase of the signal, if any, which has a maximum amount of power with respect to the code to be received, and to adjust the phase to receive that signal until another phase determination is made. It is desirable to obtain a control of frequency which is as accurate as possible. It is noted that in the system being considered, a complete scanning operation requires 2628 sequences of 10,512 clock cycles each. With an error of 50 PPM, the cumulative error would be 1381 clock cycles which would be a totally unacceptable result when making a phase correction only after each complete scanning operation.

With the use of the arrangement of the invention to control swallowing of clock cycles, it is possible to maintain an accurate control of frequency. In the transmitter, the MASK value may be initially set directly or through use of the SWVALUE to delete or swallow one clock cycle during every other sequence, thereby reducing the effective frequency by slightly less than 1/(2*10,512) or 47.564688 PPM. The same MASK value may be initially set in the receiver, which would produce operation at the same frequency in the receiver as in the transmitter if both clock circuits operate at the same frequency. However, if the frequency of the receiver is either lower or higher than that of the transmitter, the number of cycles swallowed can be controlled to make the required correction.

Assume, for example, that the frequency of the receiver clock is lower by 20 PPM than that of the transmitter clock. It would then be necessary to reduce the number of cycles swallowed to increase the receiver frequency. Increasing or decreasing the swallowing of one pulse at intervals of every second sequence changes the frequency by 47.564688 PPM; every fourth by 23.782344; every eighth by 11.891172; every 16th by 5.945586; every 32nd by 2.972793; every 64th by 1.486397; every 128th by 0.743198; every 256th by 0.371599; every 512th by 0.1858; every 1024th by 0.929; every 2048th by 0.4645; and every 4096th by 0.023225.

To increase the frequency by 20 PPM requires a change from swallowing every 2nd cycle, which produces a change of 47.564688 PPM, reducing that change by 20 PPM to 27.564688 PPM. Under the assumed conditions, each bit of the 12-bit SWVALUE produces a change of 0.023225 PPM. A change of 27.564688 PPM requires 1186.85 bits, corresponding to a binary value of 010010100011 for the SWVALUE which corresponds to a binary value of 110001010010 for the MASK value.

The operation of the receiver 72 is illustrated by the flow chart of FIG. 8. A complete scanning operation is performed, requiring 2628 sequences, under the assumed conditions. During the scanning operation, the output of the integrator circuit 110 is monitored to determine the phase, measured by a sequence count, at which the highest peak response is obtained. If the frequencies of the transmitter and receiver are equal, the peak response sequence count is the same from one cycle to another. If the peak response sequence count changes from one cycle to another, it shows that the frequencies are not equal and it is used to change the receiver frequency by changing the swallowing action.

The peak response sequence count is also used in connection with a reset of the intelligence device sequence generators of the receiver, to obtain synchronization thereof with the corresponding sequence generators of the transmitter. In the illustrated arrangement, the phase is shifted by 4 clock pulses from one sequence to another during the scan operation. The peak response sequence count reading obtained therefrom is used for starting a more accurate short scanning operation at a count prior to a previously measured peak response sequence count. In the short scanning operation, the phase is changed in intervals of one clock cycle by swallowing 3 clock cycles applied to the synchronizing sequence generator 111 of the receiver, so that the phase is advanced by only one clock cycle from one sequence to another rather than 4.

Referring to FIG. 8, setup operations are performed similar to those shown in FIG. 7 and described above. Then a test is made for the end of a sequence of operation of the synchronizing sequence generator 111, this test being made in the illustrated embodiment by monitoring the output line 115 from the decode circuit 165 of the sequence generator 111 (FIG. 5A and 5B) to determine when it brought from high to low and then back to high.

The output of the ADC 198 is then read to develop a digital value "ADC", corresponding to the magnitude of the analog signal at the output line 114 from the integrator circuit 110. Then a test is made for a new peak of the ADC. This test may by made by simply determining whether the value ADC is greater than any previously stored value called "PEAK". If so, PEAK is set equal to ADC, and the value of present sequence counter value SEQCTR, at which the peak has occurred, is stored as a "PKCTR" value. It is important to record this value, for determining when a reset operation is to be performed and it is also used in making adjustments of frequency, as hereinafter described.

The next step in the illustrated flow chart is to determine whether the sequence count "SEQCTR" is equal to a stored value "NSEQCTR" and, if so, to start over by clearing SEQCTR and PEAK. NSEQCTR may have been stored when in a previous scan operation, a peak has been recorded as occurring at a time which is so late in a scan cycle as to present potential problems. It is used in effect to causing a restart of the scanning operation designed to produce a peak at about a mid-point of the scanning cycle.

The next step is to determine whether the sequence count is equal to a RESCOUNT value which may have been computed and set in a previous scan, to signal that a short scan operation is to be performed for the purpose of obtaining an accurate reset of the intelligence sequence generators 91–98. In the short scan operation, short scan sequence counter RESCTR and a RPEAK value are cleared, then RESCTR is incremented and then three clock cycles are swallowed which would otherwise have been applied to the sequence generator through line 127, to reduce the phase advance of generator 111 from 4 clock cycles to 1 clock cycle.

Then the ADC is read and a determination is made as to whether a new peak has been detected. If so, the value of the short scan sequence counter RESCTR is recorded in RPKCTR and the value of the new peak is stored in RPEAK.

Next, a determination is made as to whether a peak has been registered and passed, by determining whether the registered ADC value has dropped by more than a constant value K from a previously measured RPEAK value. If so reset operation is performed. If not, the short scan operation is repeated, after performing an end of sequence step as indicated.

In the reset operation, the phase of the sequence generator 111 is adjusted to a value such as to obtain accurate synchronization based upon registered information and the performance characteristics of the components of the system. This may require swallowing of clock cycles which might have otherwise been applied to the line 127 and the shifting of the phase of the sequence generator 111 in a reverse direction, by shifting more than 4 clock cycles, for example. After the phase of the sequence generator is properly adjusted the intelligence sequence generators are reset through the control of the operation of the reset circuit 99 as described previously in connection with FIGS. 5A and 5B. Finally, the sequence count value SEQCTR is adjusted as required by operations performed during the short scan operation, to place it at the same value it would have had if the short scan operation had not been effected. Operations are then continued as though the short scan operation had not occurred.

In such continued operations, an end of scan test is made by monitoring the sequence count value SEQCTR which equals 2628 after a complete scan, under the assumed conditions. If the test is negative, a swallow operation is performed in a manner similar to that described above in connection with the flow chart of FIG. 7 for the transmitter.

If the end of scan test is positive, test are made as to whether PKCTR is too low, i.e. whether a peak may have occurred so early in a scan cycle as to present potential problems, in which case SEQCTR is adjusted, PEAK is cleared and the sequence operation is started anew.

Then a test is made as to whether PKCTR is too high, again presenting potential problems, in which case SEQCTR is cleared and the aforementioned NSEQCTR value is set which is designed to produce a peak at about a midpoint in a scanning cycle, the sequence operation being started anew.

Next a test is made as to the difference between the peak count value PKCTR registered in the immediately preceding scan and another peak count value LPKCTR value registered in the last scan which preceded the immediately preceding scan. If the difference, either positive or negative is within acceptable limits so as to indicate that the registered values proper, computation are made to determine the value of SWVALUE which will produce swallowing of cycles for obtaining a frequency of operation in the receiver substantially equal to that in the transmitter. The aforementioned Adjust routine is then called to reverse 12 bits of SWVALUE and to set MASK to the corresponding value.

Then a further test is made as to whether the difference between PKCTR and LPKCTR is within narrow limits appropriate for initiating a short scan operation as described above in the next cycle. The aforementioned RESCOUNT value is set to be somewhat less than the registered PKCTR value, designed to insure accurate detection of the peak in the short scan operation and a correspondingly accurate reset of the sequence generators 91–98.

Finally, LPKCTR is set equal to PKCTR and both PEAK and SEQCTR are cleared for performance of a new scan operation.

The system of the invention is versatile and readily adaptable for a variety of types of operations. As has been indicated, the output terminal 11 of the transmitter 10 and the input terminal 73 of the receiver 72 may be connected to antennas for direct propagation of the RF energy which is produced in a relatively low RF range (from about 0.533 to 1.45 MHz under the assumed conditions) or other forms of propagation means may be used. For example, such terminals may be connected to modulators and demodulators in a system for propagation of energy on carrier which may be at a much higher frequency, for example a frequency in the gigahertz range. It is also possible to use the system in propagation of energy in range much lower than the 0.533 to 1.45 MHz range of the assumed conditions of operation.

FIGS. 9A and 9B 10A and 10B illustrate a transmitter unit 221 and a receiver unit 222 having features similar to those of the transmitter 10 and receiver 72 of FIGS. 1A and 1B and 2A and 2B. Additional features are incorporated which include the use of modulators and demodulators for propagation of energy therebetween and the use of carriers on three different frequencies for propagation of energy in a wide range of frequencies. Another feature relates to operating with different codes for each channel while using amplitude-modulation in response to opposite phases or polarities of an applied signal in a manner such that the average transmitted power at any frequency within the range of frequencies transmitted is maintained substantially constant and to minimize detection by and interference with other communication systems, especially fixed frequency systems, which may be operating in the same frequency range. In the receiver unit 222, the responses to the products of a received signal with such different codes in each channel are compared to develop output signals corresponding to transmitted intelligence and such responses are summed to obtain signals which are not affected by the transmitted intelligence and which are used for synchronization.

Figure 9A:
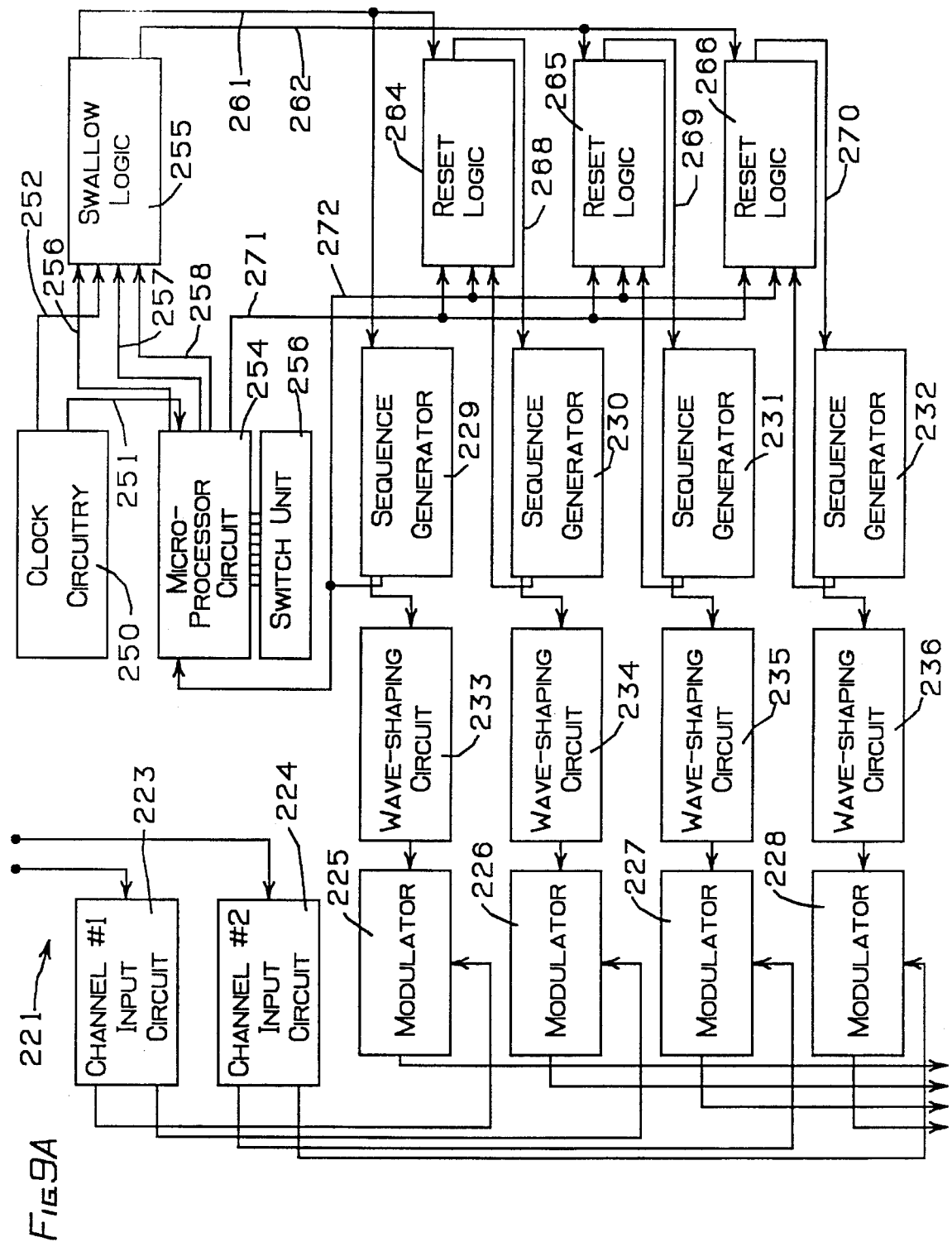

In particular, the transmitter unit 221 of FIGS. 9A and 9B comprises input circuits 223 and 224 for two channels designated as "Channel #1" and "Channel #2". Outputs of opposite phase or polarity of input circuit 223 are applied to a pair of modulator circuits 225 and 226, while outputs of opposite phase or polarity of input circuit 224 are applied to a pair of modulator circuits 227 and 228. Four different sequence signals are applied from a pair of Channel #1 sequence generators 229 and 230 and a pair of Channel #2 sequence generators 231 and 232 and through wave-shaping circuits 233–236 to the modulator circuits 225–228 the outputs of which are applied to a summing circuit 237.

In the illustrated circuit, the output of summing circuit 237 is applied to three modulator circuits 238, 239 and 240 to which carrier signals of three different carrier frequencies $f_1$, $f_2$ and $f_3$ are applied from oscillators 241, 242 and 243, all three of such carrier signals being thereby modulated by the combined signal from the output of the summing circuit 237. The modulated signals from modulators are applied through band pass filters 244, 245 and 246 to a common output circuit 247. In the illustrated circuit, the band pass filters 244–246 pass the carrier frequency and both side bands of the modulated carrier signals from the modulators 238–240. For example, the filter circuit 244 as is indicated in the drawing has a pass band from $f_1-f_s$ to $f_1+f_s$, $f_s$ being the maximum frequency of the desired range of modulated signals developed by the modulators 225–228. As an alternative, the system may be used for transmission of either a single sideband or both sidebands without a carrier, in which case the modulators 244–246 may be balanced modulators.

By way of example, the frequency $f_s$ may be 225 KHz, and the carrier frequencies $f_1$, $f_2$ and $f_3$ may be 450 KHz, 900 KHz and 1350 KHz to cover a frequency range of from 225 KHz to 1575 KHz and with a generally uniform distribution of energy over that range, except for frequencies close to such carrier frequencies.

Transmission of carriers is desirable in that there is no need to generate and synchronize carriers in the receiver when the carriers are supplied in the received signal in the proper phase relation to sideband components to reliably produce detected signals for application to product detectors to which sequence signals are applied. However, when carriers are transmitted, narrow band partially rejecting filters may be provided in the transmitter, e.g. as part of the illustrated band pass filters, to substantially reduce the amplitudes of carriers relative to side bands and provide narrow band pass filters in the receiver, e.g. as part of the illustrated band pass filters, operative to increase the amplitudes of the received carrier components to the proper levels relative to the side bands. In this way, the transmitted energy is reduced to minimize interference with other transmissions and security is increased to the extent that it is more difficult to detect the carriers.

Figure 10B:
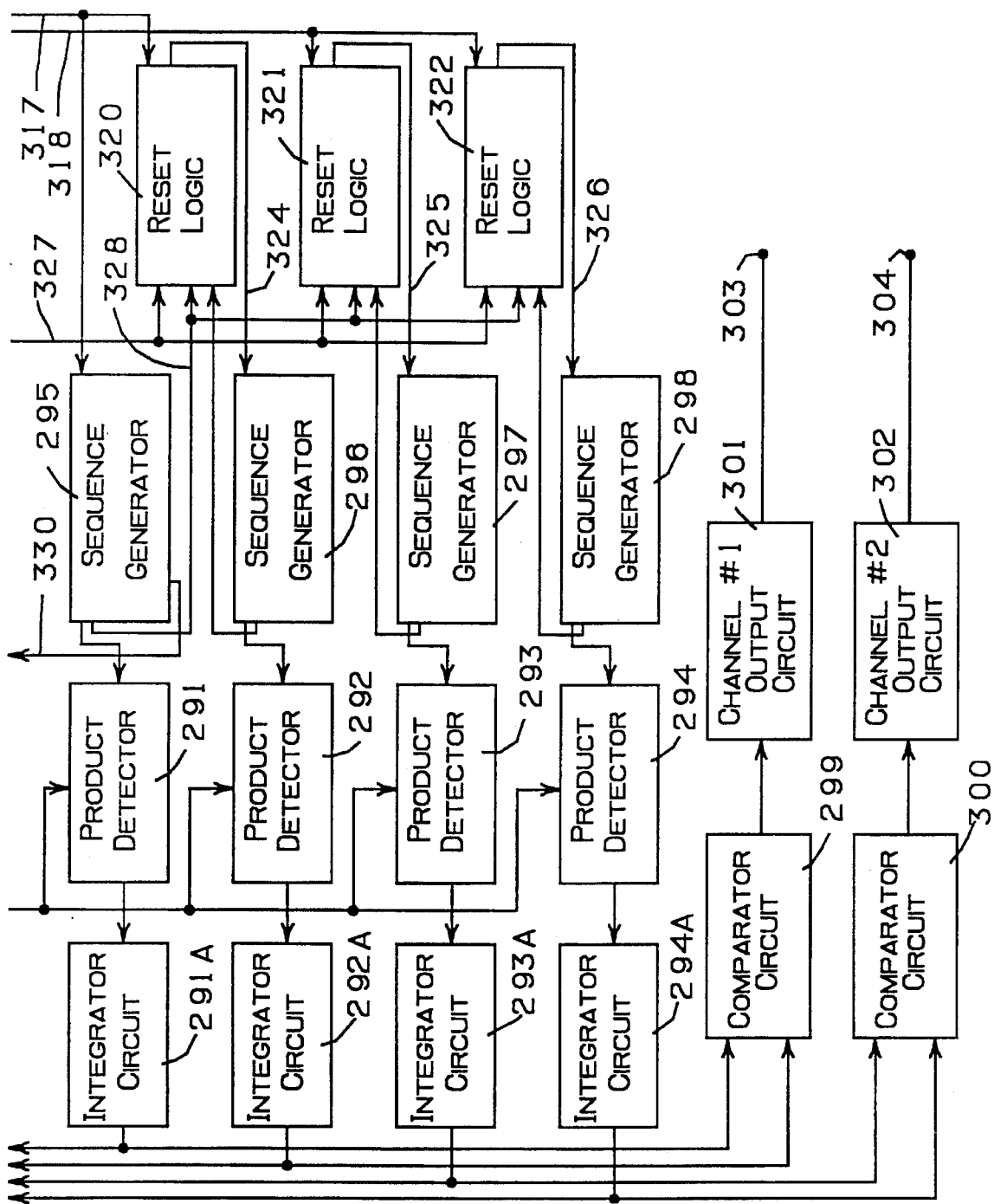

As shown, the output circuit 247 is connected to an antenna 248 for transmission through radio waves to the receiver 222 of FIGS. 10A and 10B. It will be understood that laser beams or other "wireless" transmission media as well as wires and optical cables may be used for propagation of signals from the transmitter 221 to the receiver 222.

An important feature is that the signals applied from the input circuits 223 and 224 are of opposite phase or polarity, the result being that the modulated sequence signal at the output of modulator circuit 225 increases when the modulated sequence signal at the output of modulator circuit 226 decreases, and vice versa. Thus the total power applied from the Channel #1 circuits 225 and 226 is at a substantially constant level and the same is true as to the Channel #2 circuits 227 and 228 so that the output of summing circuit 228 is at a substantially constant level, although the instantaneous signal composition changes with the modulated sequence signals applied thereto.

Another feature relates to the generation of sequence signals by the sequence generators 229–232 in a manner as hereinafter described, such as to obtain a uniform amplitude and a quite uniform frequency distribution over a range of frequencies extending from a relatively low frequency to the aforementioned maximum frequency $f_s$. This feature can be used to advantage in a system in which means other than modulation of a carrier signal are used for propagation of the signal from the output of the summing circuit 237 and in a system in which modulation of a single carrier signal is used for such propagation. However additional advantages are obtained when this feature is combined with the modulation of separate carrier frequencies, such as the frequencies $f_1$, $f_2$ and $f_3$ of the illustrated system, such as to extend the frequency range over which energy may be generally uniformly distributed. It is noted that as many carrier frequencies may be used as may be desirable to extend the frequency range over which energy is distributed.

The sequence generators 229–232 may each have a construction similar to that of the sequence generator 111 shown in FIG. 3 or that of the modified sequence generator 166 of FIG. 4. For control of synchronized operation thereof, clock signals are applied from clock circuitry 250 and through lines 251 and 252 to a microprocessor circuit 253 and a swallow logic circuit 254. The microprocessor circuit 254 is connected to the swallow logic circuit 254 through lines 256, 257 and 258 and is also connected to a switch unit 260. The swallow logic circuit 255 is connected through a lines 261 and 262 to the sequence generator 229 and reset logic circuits 264, 265 and 266. Line 261 is connected to a clock signal input of the sequence generator 229 and also to an input of the reset logic circuit 264 which is connected through a line 268 to a clock signal input of the sequence generator 230. Line 262 is connected to inputs of the reset logic circuits 265 and 266 which are connected through lines 269 and 270 to clock signal inputs of the sequence generators 231 and 232.

The reset logic circuits 264–266 are connected through a line 271 to the microprocessor circuit 254 and through a line 272 to a terminal count output of the sequence generator 229, line 272 being also connected to the microprocessor circuit 254.

The constructions of the clock circuitry 250, microprocessor circuit 254, swallow logic circuit 265 and reset logic circuits 264, 265 and 266 are similar to those of the clock circuitry 116, microprocessor circuit 120, swallow logic circuit 122 and reset logic circuit 99 of the receiver 72 shown in FIGS. 5A and 5B, differing in that ports of a microprocessor of the microprocessor circuit 254 which corresponds to the microprocessor 176 of FIGS. 5A and 5B are connected to the switch unit 256 to permit manual adjustment of the rate at which cycle swallowing operations are performed and to thereby adjust the effective frequency of clock signals applied to the sequence generators 229–232.

The swallow logic circuit 255 is controlled by the microprocessor circuit 254 under control of the switch unit 256 to periodically delete or "swallow" cycles of the clock signal applied through line 252 from the clock circuit 250 and to thereby develop clock signals on lines 51 and 52 of somewhat reduced average frequency. A similar cycle swallowing operation is performed in the receiver unit 222, but in the receiver unit 222 the average frequency may be increased or decreased under control of a microprocessor circuit to decrease or increase the rate at which cycles are swallowed in a manner such as to obtain operation in the receiver unit 222 at the same average clock frequency as in the transmitter even though the frequency of clock circuits of the transmitter and receiver may be substantially different. As aforementioned, the arrangement permits use of standard, relatively inexpensive clock circuits while obtaining accurately synchronized operation.

Each of the reset logic circuits 264–266 controls reset of the associated one of the sequence generators 230–232. The reset logic circuits 264–266 respond to a reset signal applied through the line 271 from the microprocessor circuit 254 to thereafter respond to a terminal count signal applied through line 272 from the sequence generator 229 and then temporarily cuts off application of a clock signal through line 268 to the sequence generators 230–232. Then when the sequence generator 229 thereafter reaches a certain initial or reset condition, a terminal count signal is applied through the line 272 to the reset circuits 264–266 which then restores the application of clock signals through lines 268–270 to the sequence generators 230–232. Thus all sequence generators start in unison from the same initial condition.

It is noted that through control of the swallow logic circuit 265 from the microprocessor circuit 254, clock pulses or cycles may be deleted or swallowed at certain times on both lines 261 and 262 in a manner such as to reduce the effective frequency of operation of all four of the sequence generators 229–232. Such will normally be the case. However, the circuitry permits operation under microprocessor control to obtain selective deletion of clock pulses or cycles on line 261 without deletion of clock pulses or cycles on line 262. This operation may be used, for example, if it is desired to retard the phase of operation of the Channel #1 sequence generators 229 and 230 relative to the phase of operations of the Channel #2 sequence generators 231 and 232. In such a case, the microprocessor of the microprocessor circuit 254 may be programmed to perform a reset operation to start all four sequence generators 229–232 together and to then delete a certain number of clock cycles from line 261 to retard the operation of the Channel #1 sequence generators 229 and 230 without retarding the operation of the Channel #2 sequence generators 231 and 232.

FIGS. 10A and 10b constitute is a block diagram of circuitry of the receiver unit 222 in which an input circuit 276 receives and amplifies signals from a receiving antenna 277 and applies them through three band pass filters 278, 279 and 280 to detector circuits 281, 282 and 283 having outputs connected to a summing circuit 284. As indicated, the band pass filters 278, 279 and 280 have the same pass bands as the band pass filters 244,245 and 246 of the transmitter unit 221.

The input circuit 276 preferably includes circuitry for controlling gain as a function of a control signal applied from a gain control circuit 286. In the illustrated circuitry, the gain control circuit is controlled from an output of a microprocessor circuit 287 which is connected to the output of an A–D converter circuit 288. The input of converter circuit 288 is connected through a switch circuit 289 to the output of an integrator circuit 290 connected to the output of the summing circuit 284. The switch circuit 289 is controlled from the microprocessor circuit to switch the input of the A–D converter circuit to the output of the integrator circuit 290 at certain times, and to allow conversion of the analog signal at the output of the integrator circuit to a digital signal applied to the microprocessor circuit. In response, the microprocessor circuit 287 operates through the gain control circuit 284 to control the gain of the input circuit and to maintain the output of the summing circuit 284 at a certain average level. The illustrated arrangement has advantages in that the gain control operation can be accurately controlled and easily modified as desired through programming, but it will be understood that other forms of gain control circuitry may be used.

In the operation of the receiver circuits as thus far described, the detector circuits 281, 282 and 283, which may be conventional diode detectors, demodulate the received signal components applied through the filters 278, 279 and 280, to develop output signals which are combined by the summing circuit 284 to develop a combined output signal having components corresponding to the modulated signal components at the output of the summing circuit 237 of the transmitter unit 221.

The combined output signal so developed at the output of the summing circuit 284 includes four wavetrains each of which includes a sequence of variations having predetermined varying durations and being in a predetermined distinctive pseudo-random order as determined by the signal developed by the corresponding one of the sequence generators 229–232 of the transmitter unit of FIGS. 9A and 9B. Two of such wavetrains are modulated in accordance with the amplitudes of opposite phases of the signal applied to the Channel #1 input circuit 223 of the transmitter unit 221. The other two are modulated in accordance with the amplitudes of opposite phases of the signal applied to the Channel #2 input circuit 224 of the transmitter unit 221.

For separate detection of the amplitudes of such wavetrains, four product detectors 291–294 are supplied with the output from the summing circuit and with wavetrains of the same form as used in the transmitter. Detectors 291 and 292 are Channel #1 detectors supplied with wavetrains from two Channel #1 sequence generators 295 and 296 which correspond to the sequence generators 229 and 230 of the transmitter unit 221. Detectors 293 and 294 are Channel #2 detectors supplied with wavetrains from two Channel #2 sequence generators 297 and 298 which correspond to the sequence generators 231 and 232 of the transmitter unit 221.

The outputs of the Channel #1 detectors 291 and 292 are applied through integrator circuits 291A and 292A to inputs of a comparator circuit 299 which develops an output signal which corresponds to the difference between the outputs of the detectors 291 and 292 and which is proportional to the input signal applied to the Channel #1 input circuit 223 of the transmitter unit 221 since in the transmitter unit 221, signals corresponding to opposite phases of the input signal are applied from the input circuit 223 to the Channel #1 modulator circuits 225 and 226. Similarly, the outputs of the Channel #2 detectors 293 and 294 are applied through integrator circuits 293A and 294A to inputs of a comparator circuit 300 which develops an output signal which corresponds to the difference between the outputs of the detectors 293 and 294 and which is proportional to the input signal applied to the Channel #2 input circuit in the transmitter unit 221. The outputs of the comparator circuits 299 and 300 are applied to Channel #1 and Channel #2 output circuits 301 and 302, developing final output signals at terminals 303 and 304.

To develop signals for use in synchronization, the outputs of the Channel #1 integrator circuits 291A and 292A are also applied to a Channel #1 summing circuit 305 and the outputs of the Channel #2 integrator circuits 293A and 294A are also applied to a Channel #2 summing circuit 306. The output of each of the summing circuits 305 and 306 is at a level which indicates the degree of correlation between the detected modulated wavetrains at the output of the summing circuit 284 and the wavetrains generated by the sequence generators 295–298 but is substantially independent of variations in the degree of modulation by transmitted intelligence. In response to transmitted Channel #1 intelligence components, the amplitude of the signal at the output of the integrator circuit 291A increases as the output of the integrator circuit 292A decreases, and vice versa. The same is true as to Channel #2 operation.

The outputs of the Channel #1 and Channel #2 summing circuits 305 and 306 are applied to the switch circuit 289 to be applied to the A-D converter 288 under control of the microprocessor circuit 287. As shown, the Microprocessor circuit 287 is connected to clock, swallow and reset logic circuitry similar to that of the transmitter unit 221 and also similar to circuitry in the transmitter and receiver of FIGS. 1A through 5B. In particular, clock signals are applied from clock circuitry 308 and through lines 309 and 310 to the microprocessor circuit 287 and a swallow logic circuit 312. The microprocessor circuit 287 is connected through lines 313, 314 and 315 to the swallow logic circuit 312 which is connected through lines 317 and 318 to the sequence generator 295 and reset logic circuits 320, 321 and 322. Line 317 is connected to a clock signal input of the sequence generator 295 and also to an input of the reset logic circuit 320 which is connected through a line 324 to a clock signal input of the sequence generator 296. Line 318 is connected to inputs of the reset logic circuits 321 and 322 which are connected through lines 325 and 326 to clock signal inputs of the sequence generators 297 and 298.

The reset logic circuits 320–322 are connected through a line 327 to the microprocessor circuit 287 and through a line 328 to a terminal count output of the sequence generator 295 which is connected through a line 330 to the microprocessor circuit 287.

Figure 11A:
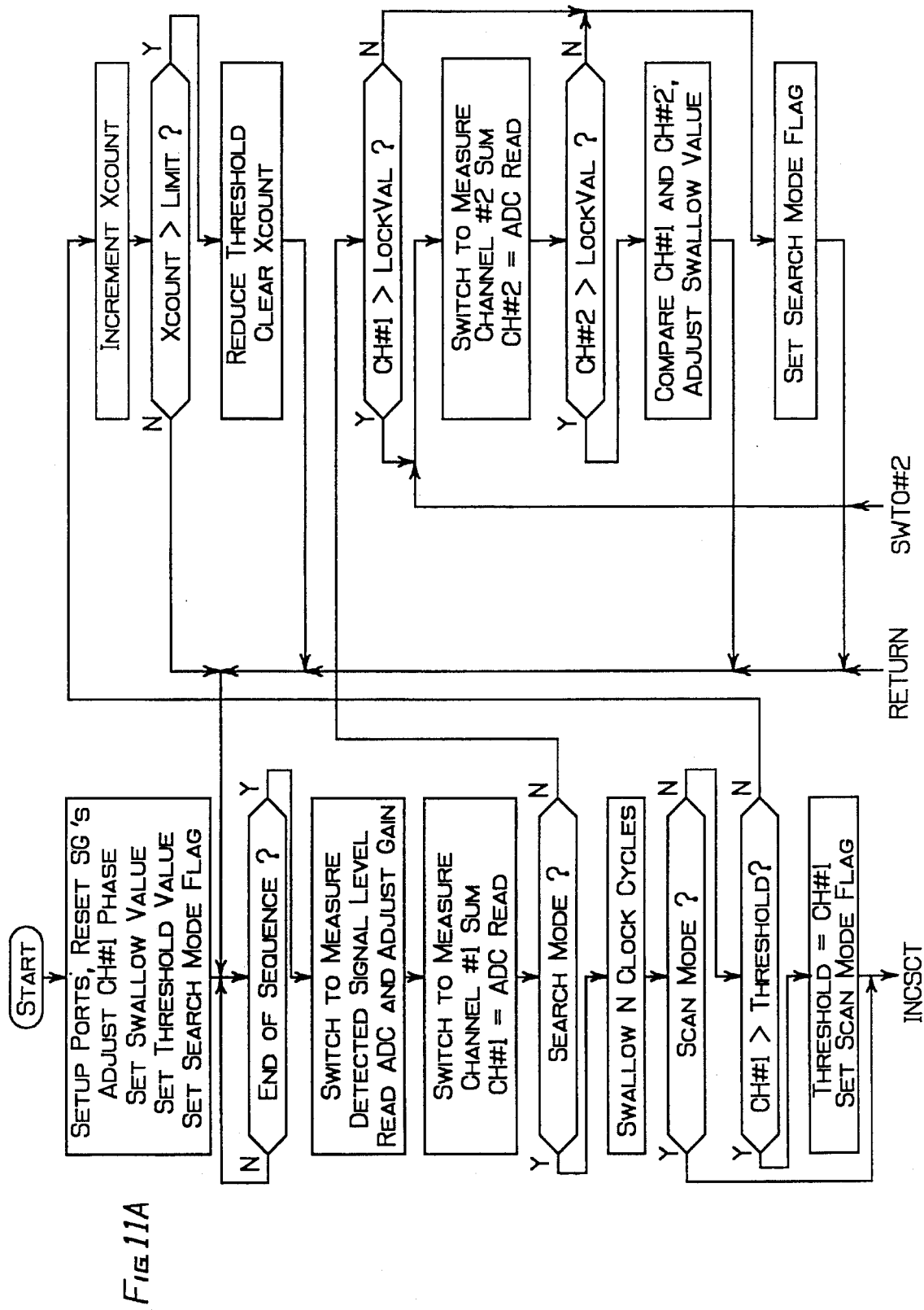
FIGS. 11A and 11B together constitute a flow chart illustrating the operation of a microprocessor of the receiver unit of FIGS. 10A and 10B.
Figure 11B:
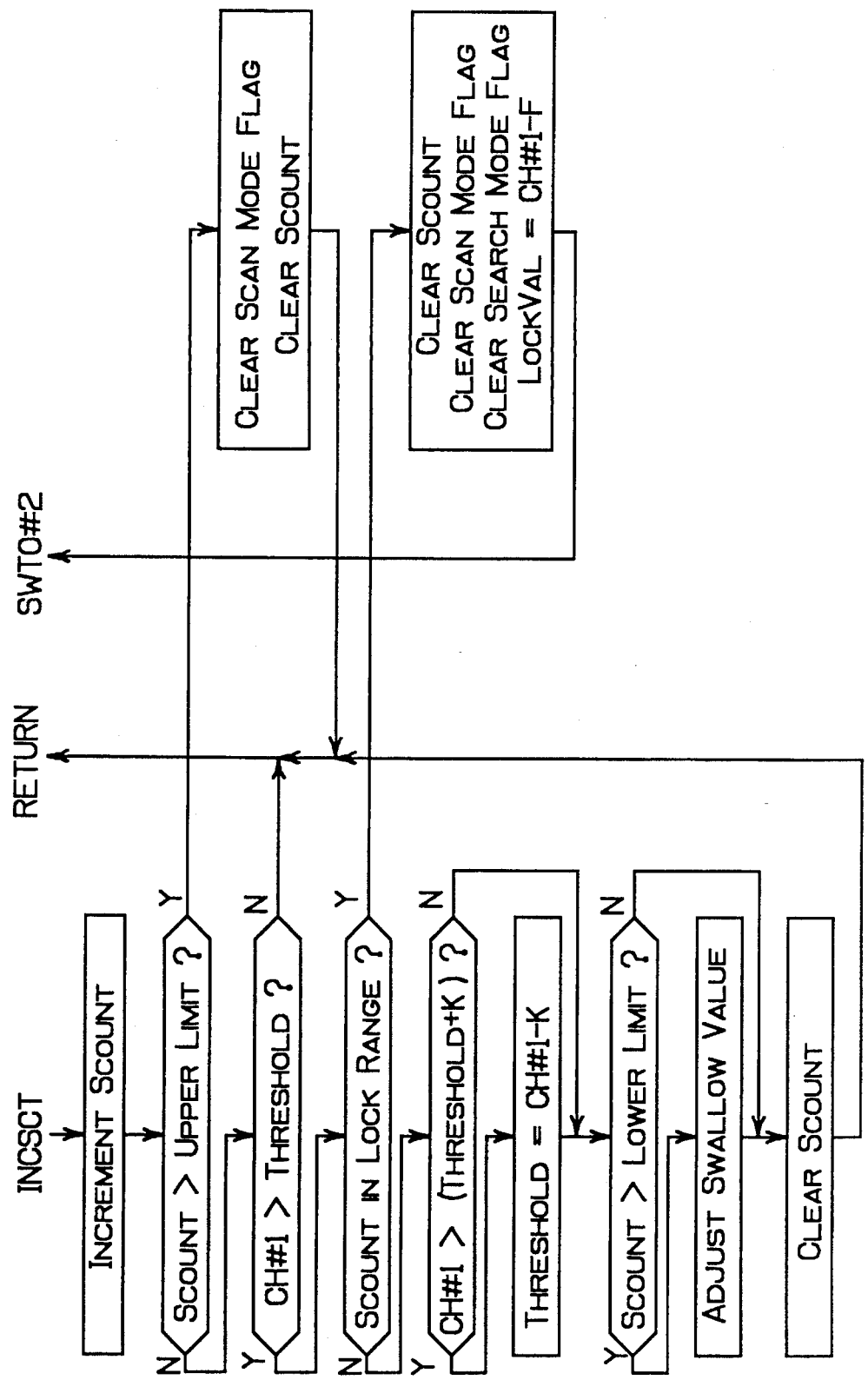

FIGS. 11A and 11B constitute is a flow diagram illustrating the operation of the receiver unit 222 under control of the microprocessor circuit 287. The operation differs from that depicted in FIG. 8 in which a complete scanning operation is performed during which the output of the integrator circuit 110 is monitored to determine the phase, measured by a sequence count, at which the highest peak response is obtained. That count is compared with the count obtained in the previous complete scanning operation for the purpose of making any required adjustment of the receiver clock frequency and for an accurately synchronization of an intelligence device sequence generator if appropriate. Even after such frequency adjustment and synchronization operations are performed, the complete scanning operation is repeated indefinitely to make any further operations as may be required. Such operation requires a separate channel used only for frequency adjustment and synchronization.

In the operation depicted in FIGS. 11A and 11B, Channel #1 of the receiver is used in performing a search for a condition in which a tracking or locking operation can be initiated. In the locking operation, Channel #1 is operated with a small phase delay relative to Channel #2 and the responses from the two channels, are compared to continually make such adjustments as may be appropriate. The phase delay is small enough to permit both channels to be then used for reception of intelligence as well as for locking, it being noted the integrated outputs of the two product detectors for each channel are compared for detection of intelligence and summed for the purpose of locking control.

Before looking at the operation in more detail, consideration may be given to examples of codes, frequencies and other values which may be used and the criteria that governs their selection, it being understood that the values hereinafter set forth are not to be construed as limitations.

In the systems of the invention as illustrated, control numbers are stored in a pseudo-random order in a memory such as the EPROM 150 of FIGS. 5B and 6 to be accessed sequentially and to control generation of a wavetrain having sequential variations each being of one polarity during an initial phase having a duration corresponding to a number of clock cycles equal to the control number and each being of the opposite polarity during a final phase of the same duration. Thus the duration of each complete cycle of a variation is equal to the duration of a number of clock cycles equal to twice the control number, and the corresponding frequency is equal to the clock frequency divided by twice the control number.

From the standpoint of security, it is advantageous to use a pseudo-random code which goes for a very long time before repeating, but long codes are impractical in many cases because of problems in synchronization. It the examples to follow, relatively short codes are assumed, consisting of a group of thirty two numbers which may be repeated eight times in a 256 byte page of memory addressed from the output of an eight bit counter such as the counter 152 of FIG. 3.

Table I of Appendix C lists thirty two control numbers, in decimal form, which may be entered in binary form in a group of thirty two consecutively accessed eight bit memory locations in a sequence generator ROM or EPROM, such as the EPROM 150 of FIGS. 5A and 5B. It also lists the durations in clock cycles of complete cycles of an output signal of a sequence generator which correspond to the listed control numbers and the corresponding frequencies, assuming a clock frequency of 20 MHz. The control numbers are not listed in Table I in the pseudo-random order in which they will normally be accessed, but rather in an order in which there is a change in equal increments of six from one number to the next, for the purpose of showing the distribution of corresponding frequencies. In this case, there is a concentration of the frequencies in the lower end of the frequency range; there is a difference of only 1.16 KHz between the frequencies which correspond to control numbers 224 and 230, as compared to a difference of 7.27 KHz between the frequencies which correspond to control numbers 44 and 50. For comparison, table II lists control numbers designed to produce a change in frequency of approximately 6 KHz from each frequency to the next higher or lower frequency, thus obtaining a substantially uniform distribution of frequencies, as may generally be desirable.

In the discussion to follow, it is assumed that a code is used which is a pseudo-random order of the thirty two control numbers of Table II of Appendix C stored in eight groups to provide 256 bytes accessed during a cycle of operation of an eight bit counter such as the counter 152 of FIGS. 5A and 5B. It is also assumed that the clock frequency is 20 MHz. Each group of thirty two requires a total of 6044 clock cycles, occurring in a time interval of 302.2 microseconds. The eight groups require a total of 2417.6 microseconds which is the assumed time of one sequence.

For demodulation, the sequences generated in the receiver must be in the proper phase relation to the corresponding sequences in the received signal. The proper phase relation is initially unknown and a searching operation is performed in which the sequences are sequentially generated with a slight delay between one sequence and the next, produced in the illustrated system by swallowing a certain number of clock pulses. The delay is chosen to be such as to insure detection of a peak condition without unduly prolonging the searching process.

Figure 12:
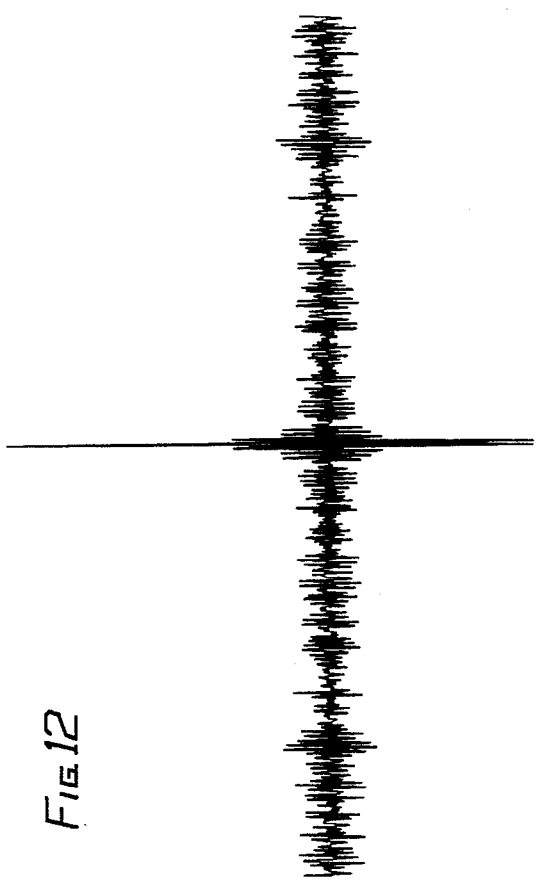
FIG. 12 is a graph illustrating the form of response obtained in a scanning operation.
Figure 13:
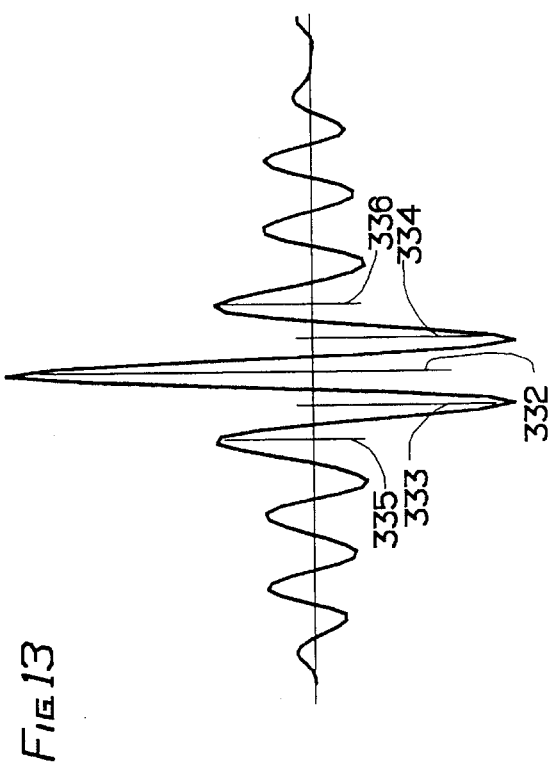
FIG. 13 is a graph corresponding to a portion of the graph of FIG. 12, but on an expanded horizontal scale.

The optimum delay may be estimated from consideration of FIGS. 12 and 13. FIG. 12 is a graph produced by a computer program to analyze the operation with a sequence similar to those used in the embodiment of FIGS. 1A through 5B and with a code such as set forth in Appendix A, similar to the code now being assumed, although not exactly the same. That computer program effected multiplication of such a sequence and a replication thereof which was progressively delayed to effect a complete scan, FIG. 12 being a graph of response versus the delay which may be measured in clock cycles. FIG. 13 is a reproduction of a central portion of the graph of FIG. 12 with the horizontal scale being expanded.

A maximum positive peak is produced at a phase indicated by a line 332 in FIG. 13 with two negative peaks of lesser amplitude being produced at phases indicated by lines 333 and 334. The difference between phase 333 and 332 is approximately equal to that between phase 332 and phase 334 and is approximately equal to a 180 degree phase shift of a variation of average duration. It is explained by the fact that such 180 degree phase shift will effect a reversal of the response in the case of a variation of average duration but the reversal effect is reduced in magnitude in proportion to an increase or decrease of the duration of a variation above or below the average duration. Two positive peaks are produced at phases indicated by lines 335 and 336 at approximately 360 degree phase displacements from the phase 332 and may be explained in a similar manner.

It can be seen from examination of FIG. 13 that the primary peak might be missed completely if the phase shift from one scan to the next is 90 degrees or more in relation to the average duration of variations. It is also apparent that the phase shift should preferably be less than 45 degrees and most preferably on the order of 20 degrees, even less than 20 degrees if the time required for synchronization is not critical. With reference to Table II of Appendix C, the average duration of a cycle is equal to 6044/32 or about 189. A 20 degree phase shift is about 189/18 or 10.5 clock cycles; a phase shift of 10 cycles may be assumed.

Since the total number of clock cycles for each of the eight assumed groups of thirty two numbers is 6044, it will require 6044/10 or about 604 scans to test at all phase positions, assuming that a phase shift of 10 cycles is used. If a time of one sequence is equal to 2417.6 microseconds, the time required for eight thirty-two control number groups as discussed above, it will require 604*2417.6 or about 1.46 seconds for a complete scanning operation. If desired, and if it will not interfere with completion of operations of the microprocessor circuit, this may be cut in half by using a seven bit address counter in place of an eight bit address counter so as to use a sequence duration corresponding to four groups or may be cut in four by using six bit counter.

Referring now to FIGS. 11A and 11B, an initial set up operation is performed in which default swallow and threshold values are set, in which a search mode flag is set and in which the Channel #1 phase is adjusted, as by swallowing a certain number of clock cycles which would otherwise be transmitted on line 261, FIGS. 9A and 9B. The purpose is to provide a phase displacement between the two channels when they are used together in a track or lock mode as will be described. By way of example, 10 clock cycles may be swallowed to obtain a phase displacement of approximately 20 degrees at the average duration of a wavetrain variation.

Next there is a test for the end of a sequence, performed by testing the terminal count output of a counter such as the counter 152 of FIGS. 5A and 5B. When such is detected, a gain control operation is performed, then the switch 289 is switched to use the A–D converter to measure the Channel #1 signal at the output of the summing circuit 305 and to store it as a "CH#1" value. Then the search mode flag is tested and if set, as will initially be the case, a certain number of cycles, e.g. ten cycles, are swallowed to obtain the phase change discussed above. In this case, cycles are swallowed which would normally be applied through both lines 317 and 318 (FIGS. 10A and 10B); it is desirable to keep the two channels in a phase displaced relation which is appropriate for a subsequent lock operation.

Next, a scan mode flag is tested. If not in a scan mode, as will initially be the case, the stored CH#1 value is compared to the Threshold value. If not greater as will probably be the case initially, an Xcount value is incremented, as test is made to determine if it is above a certain limit, the Threshold value being reduced toward a certain minimum value if it is, and the program jumps back to the point at which an end-of-sequence test is made.

When a greater than Threshold CH#1 value is detected, the Threshold value is made equal to the CH#1 value, a scan mode flag is set, then a Scount value is incremented and then a test is made to see if it is above a certain limit which may be 606 for example, somewhat greater than the 604 sequences assumed to be required for a complete scan. If so, the scan mode flag and the Scount value are cleared and the operation returns to the end-of-sequence test point. If not above the limit a CH#1>Threshold test is made.

If the CH#1>Threshold test is negative, the operation returns to the end-of-sequence test point. If positive, a test is made to determine whether the Scount value is appropriate for initiating a lock operation, e.g. the 604 value under the assumed conditions. If so, the lock operation is initiated as hereinafter described. If not, the Threshold value may be increased, as may be desirable if the CH#1 value is much greater than the Threshold value. Before initiating a lock operation, it is desirable that there be two peaks which are of about the same magnitude as well as being within the sequential count lock range.

Next a test is made to determine whether the Scount is above a certain lower limit which may be 601, for example, under the assumed conditions. If not the operation returns to the end-of-sequence test point, after clearing the Scount value. If so, however, the Scount value will at this point will be not greater than the upper limit of 606 and will not be the lock value of 604 as well as being above 601, i.e. it will be 602, 603, 605 or 606. Under such circumstances, it may be appropriate to adjust the swallow value to adjust the frequency. If the Scount value is 605 or 606 for example, it indicates that the frequency is too low and the rate of swallowing of clock cycles may be reduced to increase the frequency. It should be understood that the frequency adjust operations are performed in the same manner as in the first embodiment. After such frequency adjust operations as may be necessary, the operation returns to the end-of-sequence test point.

When the lock operation is initiated, Scount and the Scan and Search Mode Flags are cleared and then a value "Lock-Val" is set equal to CH#1 minus a constant F, which may be either a fixed number or a certain fraction of CH#1. Then the switch 289 (FIGS. 10A and 10B) is switched to use the A–D converter 288 to measure the Channel #2 signal at the output of the summing circuit 306 and to store it as a "CH#2" value. Then the stored CH#1 and CH#2 values are compared and an appropriate adjustment of the swallow value is made. With the Channel #1 sequence generator lagging the Channel #2 sequence generator, a CH#1 value less than the CH#2 value indicates that the clock frequency should be increased, i.e. that the rate of swallowing of clock pulses should be decreased.

Once the search mode flag is cleared, the lock operation continues indefinitely, until one or the other of the CH#1 or CH#2 values falls below the LockVal value, at which time the search mode flag is set and another searching operation is initiated.

Figure 14:
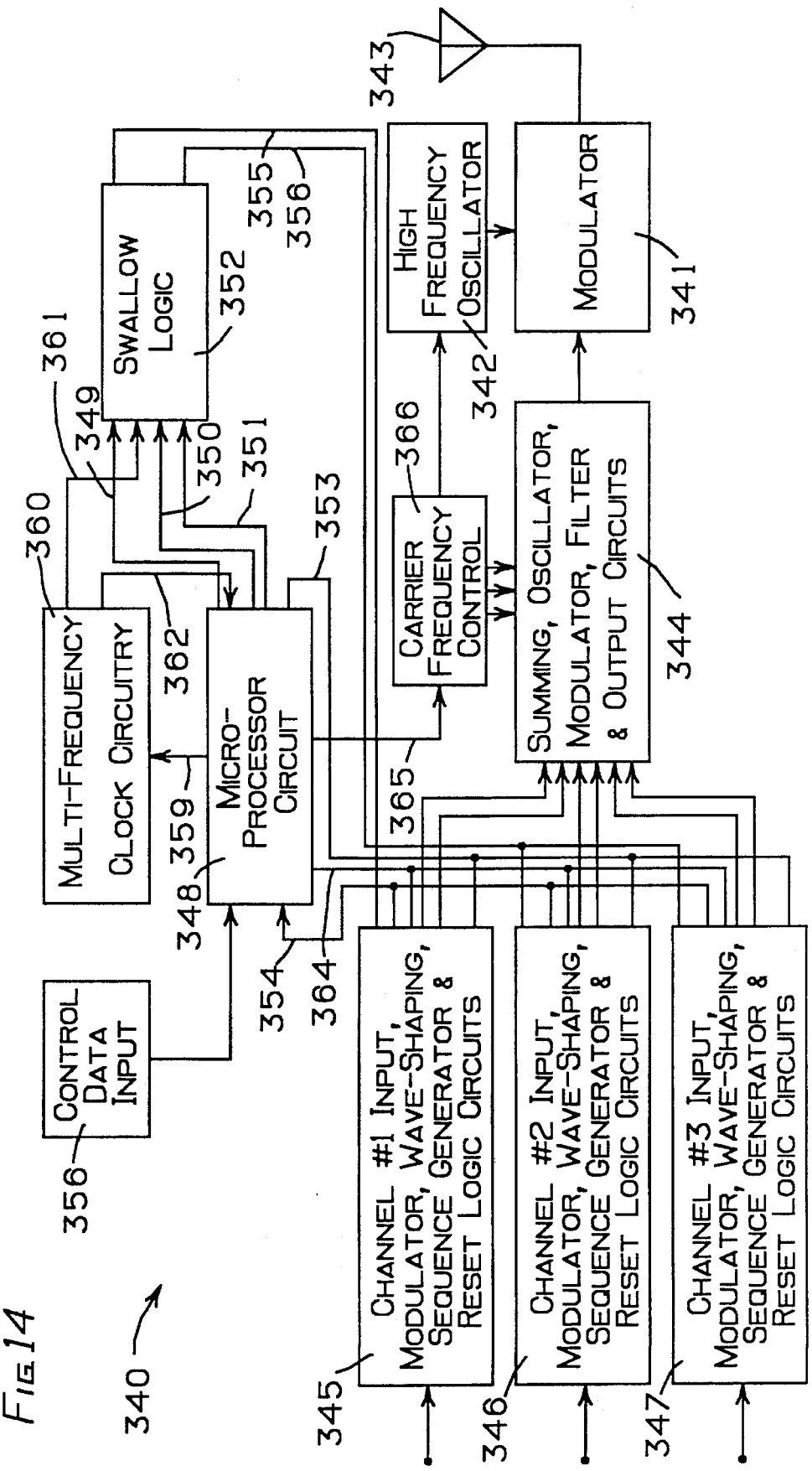
FIG. 14 is a schematic block diagram of a transmitter unit incorporating further features of the invention.

FIG. 14 illustrates another form of transmitter unit 340 which is constructed in accordance with the invention. It is similar to the transmitter unit 221 of FIGS. 9A and 9B, but incorporates a number of additional important features.

Output signals are generated in the same manner as in the unit 221 of FIGS. 9A and 9B, but rather than being applied to an antenna or otherwise directly propagated, they are applied to a modulator 341 to modulate a high frequency carrier signal generated by a high frequency oscillator 342, the output of modulator being shown applied to an antenna 343.

The modulator 341 is supplied with signals generated by converter circuits 344 shown as receiving signals from Channel #1, Channel #2 and Channel #3 modulated wavetrain generating circuits 345, 346 and 347. The converter circuits 344 include summing, oscillator, modulator, filter and output circuits which may preferably be circuits similar to the summing circuit 237, oscillator circuits 241–243, modulator circuits 238–240, band-pass filters 244–46 and output circuit 247 of FIG. 9A and 9B. However, the converter circuits 344 may differ somewhat from what is shown in FIGS. 9A and 9B and in that in appropriate cases, the composite modulated wave train signal from the output of the summing circuit 237 may be applied directly to the output circuit 247 as well as to the modulators 238–240.

The Channel #1 and Channel #2 modulated wavetrain generating circuits 345 and 346 include modulator, wave-shaping, sequence generator, and reset logic circuits which may preferably be circuits similar to the modulator circuits 225–228, wave-shaping circuits 233–236, sequence generators 229–232 and reset logic circuits 264–266. The Channel #3 modulated wavetrain generating circuit 347 may be similar to the circuits of FIG. 9A and 9B which are used to generate the Channel #2 modulated wavetrains. It will be understood that modulated wavetrain generating circuits for one or more additional channels may be added, as needed.

By way of example, the carrier frequency generated by the high frequency oscillator may be on the order of 900 MHz or an even higher frequency in the gigahertz range. With reference to the examples given above in connection with FIGS. 9A and 9B, modulated wavetrains may be generated by the circuits 345–357 at a maximum frequency $f_s$ of 125 KHz and three carriers may be used in the converter circuits 344 operating at $f_1$, $f_2$ and $f_3$ frequencies of 450 KHz, 900 KHz and 1350 KHz, the highest frequency of the spectrum generated by the converter circuits 344 will be on the order of 1575 KHz, and the high frequency modulator will generate a signal with frequency components spread over a range of 1575 KHz times 2, or 3.15 MHz. These values are given by way of illustrative example and to show how it is possible to select frequency and other values to obtain the most effective use of any portion of the frequency spectrum which may be available for a given purpose.

The modulated wavetrain generating circuits 345–347 are controlled from a microprocessor circuit 348 which is connected through lines 349, 350 and 351 to a swallow logic circuit 352, also through a line 353 to reset logic of the modulated wavetrain generating circuits 345–347 and through a line 354 to a terminal count output of a counter of one of the Channel #1 sequence generators. Line 354 corresponds to line 272 in FIGS. 9A and 9B and is connected to reset circuits of the Channel #2 and Channel #3 modulated wavetrain generating circuits 346 and 347. A line 355, which corresponds to line 261 of FIGS. 9A and 9B, connects the swallow logic 352 to the Channel #1 circuit 345 and a line 356, which corresponds to the line 262 of FIG. 9A and 9B, connects the swallow logic 352 to the circuits 346 and 347.

Microprocessor circuit 348 performs important functions in addition to the those performed by the microprocessor circuit 254 of FIGS. 9A and 9B. It operates under control of data supplied from a control data input circuit 358 to operate through a line 359 control the base frequency of multi-frequency clock circuitry 360 operating to supply clock signals to the swallow logic 352 and microprocessor circuit 348 through lines 361 and 362. It is also connected through a line 364 to the modulated wavetrain generating circuits 345–347 to supply memory control signals for control of the codes of the generated wavetrains. In addition, it is connected through a line 365 to a frequency control circuit operative to select frequencies used in the converter circuit 344 and the frequency of the high frequency oscillator.

Figure 15:
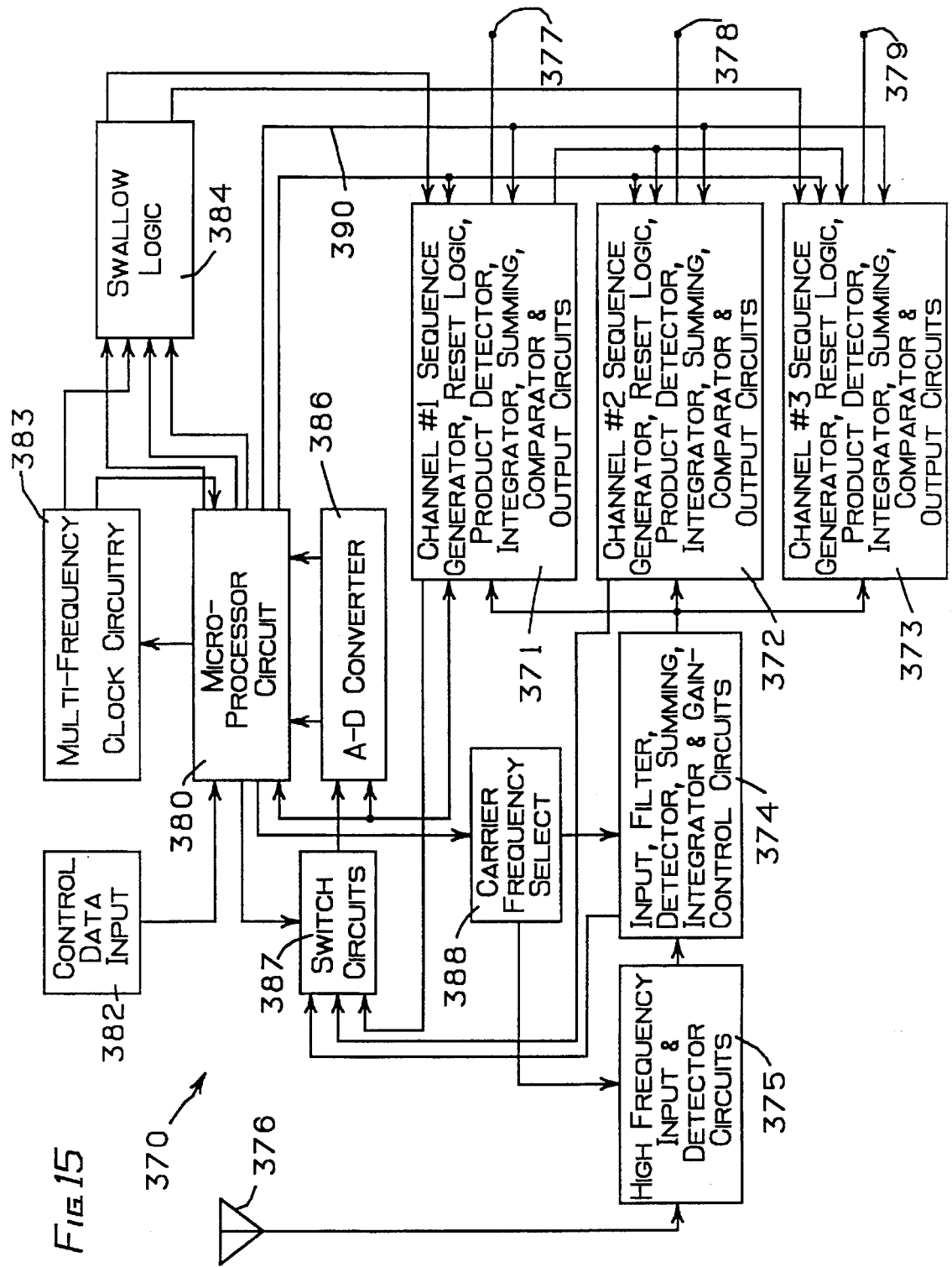
FIG. 15 is a schematic block diagram of a receiver unit usable with the transmitter unit of FIG. 14.

FIG. 15 shows a receiver unit 370 for use with the transmitter unit 340 and having corresponding features. It includes Channel #1, Channel #2 and Channel #3 signal processing and demodulating circuits 371, 372 and 373 which receive a signal from the output of what will be referred to as a low frequency detector circuit 374 which responds to signals from high frequency input and detector circuits 375 shown connected to an antenna 376.

The high frequency input and detector circuits 375 operate to receive, amplify and detect the modulated high frequency carrier signal sent from the transmitter unit 340 to develop a signal corresponding to the output of the converter circuit 344 of the transmitter unit 340. The signal so detected is applied to the low frequency detector circuit 374 preferably includes signals corresponding to circuits 276, 278–284 and 286 of FIG. 10A and 10B and which develops a signal having components corresponding to the modulated wavetrain signals developed at the outputs of the modulated wavetrain generating circuits 345–347 of the transmitter 340. The signal so developed is applied to the signal processing and demodulator circuits 371–373 to develop output signals at output terminals 377, 378 and 379 which correspond to the input signals to the modulated wavetrain generating circuits 345–347 of the transmitter 340. Circuits 371–373 preferably include sequence generator, reset logic, product detector, integrator, summing and comparator circuits corresponding to the circuits 295–298, 320–322, 291–294, 291A–294A, 305,306 and 299,300 of FIGS. 10A and 10B, A microprocessor circuit 380 is controlled from a control data input circuit 382 and controls multi-frequency clock circuitry 383 and swallow logic 384 as well as controlling reset operations, using circuitry similar to the circuitry which includes microprocessor circuit 348, data input circuit 358, multi-frequency clock circuitry 360 and swallow logic 352 in FIG. 14, with similar connections. The microprocessor 380 is also connected to an A–D converter 386 which controls a switch unit 387 similar to the switch unit 289 of FIGS. 10A and 10B, to selectively control input to the A–D converter 386 of analog signals corresponding to the input signal level and Channel #1 and Channel #2 summing circuits.

In addition, the microprocessor 380 is connected to a carrier frequency select circuit 388 which may effect any necessary control of tuning circuits of the low and high frequency detector circuits 374 and 375. Further, the microprocessor circuit 380 is connected through a control line 390 to memory circuits of sequence generators in the demodulator circuits 371–373, for operation with codes corresponding to those used in the wavetrain generating circuits of the transmitter 340.

It will be understood that the microprocessors of the circuits 348 and 380 of the transmitter unit 340 and receiver unit 370 may be readily programmed to accept data supplied from the control data input circuits 356 and 382 select the base clock frequency, the codes used by sequence generators in generating modulated wavetrains by the circuits 345–347 in the transmitter unit 340 and in demodulating such wavetrains in circuits 371–373 of the receiver unit 370. It may also control the frequencies used in the converter circuit 364 of the transmitter unit 340 and in the low frequency input and detector circuit 374 of the receiver 370, as well as the frequency of the high frequency oscillator 342 of the transmitter unit 340 and the tuning thereto in the high frequency detector circuit 375 of the receiver unit 370.

The control data input to each of the circuits 356 and 382 may be from a keyboard or other manually controlled device, from a memory card or the like, from a parallel or serial interface to a computer or other control device, or from any other source. Combined with other features of the system, users are permitted to effect communications with a high degree of security, while obtaining optimum use of available frequency spectrums and communication channels. The system is otherwise highly versatile.

It will be understood that modifications and variations may be effected without departing from the spirit and scope of the novel concepts of this invention

APPENDIX A

TABLE I
(Sync. Code, Receiver, Hex.)

```
0B 1D 0E 0D 19 17 10 1E 1A 1C 14 16 0F 15 13 0C
11 1B 18 12 1D 13 1B 16 0E 0D 0B 19 0C 0F 18 1E
15 11 10 1C 17 1A 12 14 10 18 19 0E 1D 1A 1C 16
1B 12 0D 0F 13 14 1E 11 0B 0C 17 15 13 0B 1C 11
14 16 1D 17 1E 0E 0C 15 10 0F 18 0D 1A 19 12 1B
18 19 1B 0E 0F 1A 12 1C 1E 0D 10 17 15 0B 16 13
14 11 1D 0C 1B 11 17 10 1D 14 18 0B 13 1E 15 0C
0F 12 0E 19 1C 0D 1A 16 1E 15 1A 18 1D 19 11 17
1C 13 16 14 1B 12 0E 0D 0C 0B 0F 10 11 1A 19 13
0B 1E 14 1B 0C 1D 15 17 16 0E 1C 0F 10 0D 18 12
0E 0D 16 1A 13 1E 1B 0F 17 11 15 19 10 0C 12 1D
0B 1C 18 14 1B 0F 1C 12 1D 14 11 0D 13 0C 1A 16
18 15 17 10 0B 19 1E 0E 1C 14 1E 1B 0F 0D 0E 12
15 16 1A 1D 0C 11 17 13 0B 18 19 10 18 15 11 12
0E 17 1A 13 0B 1D 0F 1B 10 14 16 1C 0C 0D 19 1E
0E 0C 0E 10 0B 12 0D 15 13 14 19 0C 16 10* 50 15
```

TABLE II
(Sync. Code, Receiver, Dec.)

```
11 29 14 13 25 23 16 30 26 28 20 22 15 21 19 12
17 27 24 18 29 19 27 22 14 13 11 25 12 15 24 30
21 17 16 28 23 26 18 20 16 24 25 14 29 26 28 22
27 18 13 15 19 20 30 17 11 12 23 21 19 11 28 17
20 22 29 23 30 14 12 21 16 15 24 13 26 25 18 27
24 25 27 14 15 26 18 28 30 13 16 23 21 11 22 19
20 17 29 12 27 17 23 16 29 20 24 11 19 30 21 12
15 18 14 25 28 13 26 22 30 21 26 24 29 25 17 23
28 19 22 20 27 18 14 13 12 11 15 16 17 26 25 19
11 30 20 27 12 29 21 23 22 14 28 15 16 13 24 18
14 13 22 26 19 30 27 15 23 17 21 25 16 12 18 29
11 28 24 20 27 15 28 18 29 20 17 13 19 12 26 22
24 21 23 16 11 25 30 14 28 20 30 27 15 13 14 18
21 22 26 29 12 17 23 19 11 24 25 16 24 21 17 18
14 23 26 19 11 29 15 27 16 20 22 28 12 13 25 30
14 12 14 16 11 18 13 21 19 20 25 12 22 16* 80 21
```

\* This byte = 12 Hex. or 18 Dec. in Sync. Code of transmitter; decreased by 2 in receiver to obtain phase advance in receiver relative to transmitter.

TABLE III
(Intelligence Code, T & R, Hex.)

```
0C 18 0B 15 16 13 10 17 0E 14 0F 1D 1A 1B 1C 19
12 1E 0D 11 15 1C 0B 0E 19 1A 0C 11 1E 13 16 0F
1B 17 10 14 12 0D 1D 18 0C 1B 15 1A 19 1E 10 0D
14 18 0B 17 0E 0F 11 16 1D 1C 13 12 16 14 15 18
1B 1C 19 0C 10 12 13 17 0D 0B 0F 1A 11 1D 0E 1E
16 19 12 0F 17 1D 1A 13 0C 11 18 10 14 1B 0D 15
1E 1C 0E 0B 11 1D 10 0B 0F 14 0E 1E 16 0C 1C 19
13 12 1B 1A 18 0D 15 17 17 1E 14 18 1A 13 0B 1D
1C 12 15 0F 0E 0C 11 16 19 0D 1B 10 12 0E 14 16
1C 1E 0F 19 1A 10 1B 11 1D 18 0D 0C 13 17 0B 15
0E 11 0F 17 1A 0B 16 12 0D 18 1D 1B 19 1C 1E 15
14 13 10 0C 16 1B 15 0B 0C 1D 1C 0F 17 14 11 19
10 1A 0D 13 0E 1E 12 18 14 19 1D 1B 17 0E 13 12
18 0F 0D 0C 1E 16 11 15 10 0B 1A 1C 1E 0B 16 17
0F 10 18 19 0D 11 13 1A 1B 12 0C 1D 14 1C 15 0E
0E 18 15 16 1E 1C 14 10 11 19 1A 17 12 18 0F 0D
```

TABLE IV
(Intelligence Code, T & R, Dec.)

```
12 24 11 21 22 19 16 23 14 20 15 29 26 27 28 25
18 30 13 17 21 28 11 14 25 26 12 17 30 19 22 15
27 23 16 20 18 13 29 24 12 27 21 26 25 30 16 13
20 24 11 23 14 15 17 22 29 28 19 18 22 20 21 24
27 28 25 12 16 18 19 23 13 11 15 26 17 29 14 30
22 25 18 15 23 29 26 19 12 17 24 16 20 27 13 21
30 28 14 11 17 29 16 11 15 20 14 30 22 12 28 25
19 18 27 26 24 13 21 23 23 30 20 24 26 19 11 29
28 18 21 15 14 12 17 22 25 13 27 16 18 14 20 22
28 30 15 25 26 16 27 17 29 24 13 12 19 23 11 21
14 17 15 23 26 11 22 18 13 24 29 27 25 28 30 21
20 19 16 12 22 27 21 11 12 29 28 15 23 20 17 25
16 26 13 19 14 30 18 24 20 25 29 27 23 14 19 18
24 15 13 12 30 22 17 21 16 11 26 28 30 11 22 23
15 16 24 25 13 17 19 26 27 18 12 29 20 28 21 14
14 24 21 22 30 28 20 16 17 25 26 23 18 24 15 13
```

APPENDIX B
(Routines associated with cycle swallowing)

```
===== Parallax PIC16C5x Assembler  v1.9 =====
 8  00E-            scl      ds  1  ;seq. ctr low
 9  00F-            sch      ds  1  ;seq. ctr high
10  010-            masl     ds  1  ;mask low
11  011-            mash     ds  1  ;mask high
12  012-            til      ds  1  ;temp low value for input etc.
13  013-            tih      ds  1  ;temp high value for input etc.
14  014-            tol      ds  1  ;temp low value for output etc.
15  015-            toh      ds  1  ;temp high value for output etc.
16  016-            svl      ds  1  ;swallow value low
17  017-            svh      ds  1  ;swallow value high 23  01C-            device   pic16c54,hs_osc,wdt_off,protect_off
24  1FF- A1C        reset    start
25  01C-            start
26  01C- C04 005             mov !ra,#0100b
27                           ; ra 2 (pin 1) in, ra 0, 1 and 3
28                           ; (pins 17, 18 and 2) out
29  01E- C0B 125             or ra, #1011b; set pins 17 & 18 high
30  020- C06 165             and ra, #0110b   ; set pins 17 & 2 low
31  022- C01 125             or ra, #0001b ; then 17 high for sync
32  024- CFE 006             mov !rb, #11111110b; rb0 out(pin6)
                                              ; out, 1-7in
33  026- C01 126             or rb, #00000001b; set pin 6 high
34
35  028- 06E                 clr scl
36  029- 06F                 clr sch
37  02A- 070                 clr masl
38  02B- 071                 clr mash
39  02C- 06C                 clr trl
40  02D- 06D                 clr trh
41  02E- C00 036             mov svl, #00000000b
42  030- C04 037             mov svh, #00000100b
43  032- 934                 call adj
44  033- A6C                 jmp test
45
46  034- 216 032    adj      mov til, svl
47  036- 946                 call revo        ;low nibble reversed &
48  037- 214 031             mov mash, tol ;stored as highest
                                           ; of 3 nibs
49
50  039- 216 032             mov til, svl 51  03B- 3B2                 swap til ;middle nibble placed in
52  03C- 946                 call revo;low position, reversed
53  03D- 3B4                 swap tol ;and placed back in middle
```

```
51  03B- 3B2                swap til   ;middle nibble placed in
52  03C- 946                call revo  ;low position, reversed
53  03D- 3B4                swap tol   ;and placed back in middle
54  03E- 214 030            mov masl, tol ;position as high
55                                        ;nibble of masl
56
57  040- 217 032            mov til, svh  ;highest of 3 nibbles
58  042- 946                call revo     ; (low nib of svh)
59  043- 214 130            or masl, tol  ;reversed and stored
60                                        ;as low nibble of masl
61  045- 800                ret
62  046-         revo
63  046- 074                clr tol
64  047- 212 033            mov tih, til
65  049- C01 173            and tih, #00000001b
66  04B- 403                clc
67  04C- 373                rl tih
68  04D- 373                rl tih
69  04E- 373                rl tih
70  04F- 213 134            or tol, tih
71
72  051- 212 033            mov tih, til
73  053- C02 173            and tih, #00000010b
74  055- 403                clc
75  056- 373                rl tih
76  057- 213 134            or tol, tih
77
78  059- 212 033            mov tih, til
79  05B- C04 173            and tih, #00000100b
80  05D- 403                clc
81  05E- 333                rr tih
82  05F- 213 134            or tol, tih
83
84  061- 212 033            mov tih, til
85  063- C08 173            and tih, #00001000b
86  065- 403                clc
87  066- 333                rr tih
88  067- 333                rr tih
89  068- 333                rr tih
90  069- 213 134            or tol, tih
91  06B- 800                ret
92
93  06C-         test       ; main routine in which
                            ; terminal count output of
                            ; address counter is tested
                            ; to see if it is low and, if it is
                            ; to perform scanning and tracking
                            ; operations.
```

```
143   0C4-           contino      ; performed after completing
144                               ; scanning operations and before
                                  ; going back to "test"
                                  ; perform swallow operations as
                                  ; required
145   0C4- 20E 032                mov til, scl     ;store seq. count
                                                   ;values before
146   0C6- 20F 033                mov tih, sch     ;increment, for
                                                   ;comparison with
147   0C8- 3EE ACB                ijnz scl, xcount ;new values to
                                                   ;determine
                                                   ;bit changed from
148   0CA- 2AF                    inc sch          ;zero to one
149
150   0CB- 272       xcount       not til
151   0CC- 20E 172                and til, scl
152   0CE- 210 172                and til, masl
153
154   0D0- 643 AD6                jz nopulsel
155   0D2- C0D 165                and ra, #1101b   ;bring pin 18 low,
156   0D4- C02 125                or ra, #0010b    ;then high to
                                                   ; initiate swallow
157
158   0D6- 273       nopulsel     not tih
159   0D7- 20F 173                and tih, sch
160   0D9- 211 173                and tih, mash
161   0DB- 643 AE1                jz nopulseh
162   0DD- C0D 165                and ra, #1101b   ;bring pin 18 low,
163   0DF- C02 125                or ra, #0010b    ;then high to
                                                   ;initiate swallow
164
165   0E1-           nopulseh
166   0E1- A6C                    jmp test
```

APPENDIX C

TABLE I (Clock frequency of 20 MHz assumed)

| Control Number | Duration (Clock cycles) | Frequency KHz |
|---|---|---|
| 230 | 460 | 43.48 |
| 224 | 448 | 44.64 |
| 218 | 436 | 45.87 |
| 212 | 424 | 47.17 |
| 206 | 412 | 48.54 |
| 200 | 400 | 50.00 |
| 194 | 388 | 51.55 |
| 188 | 376 | 53.19 |
| 182 | 364 | 54.95 |
| 176 | 352 | 56.82 |
| 170 | 340 | 58.82 |
| 164 | 328 | 60.98 |
| 158 | 316 | 63.29 |
| 152 | 304 | 65.79 |
| 146 | 292 | 68.49 |
| 140 | 280 | 71.43 |
| 134 | 268 | 74.63 |
| 128 | 256 | 78.13 |
| 122 | 244 | 81.97 |
| 116 | 232 | 86.21 |
| 110 | 220 | 90.91 |
| 104 | 208 | 96.15 |
| 98 | 196 | 102.04 |
| 92 | 184 | 108.70 |
| 86 | 172 | 116.28 |
| 80 | 160 | 125.00 |
| 74 | 148 | 135.14 |
| 68 | 136 | 147.06 |
| 62 | 124 | 161.29 |
| 56 | 112 | 178.57 |
| 50 | 100 | 200.00 |
| 44 | 88 | 227.27 |

Total Clock Cycles = 8768
Total time = 438.4 microseconds

APPENDIX C
(cont.)

TABLE II

(Clock frequency of 20 MHz assumed)

| Control Number | Duration (Clock cycles) | Frequency KHz |
|---|---|---|
| 250 | 500 | 40.00 |
| 217 | 434 | 46.08 |
| 192 | 384 | 52.08 |
| 172 | 344 | 58.14 |
| 156 | 312 | 64.10 |
| 142 | 284 | 70.42 |
| 131 | 262 | 76.34 |
| 121 | 242 | 82.64 |
| 113 | 226 | 88.50 |
| 106 | 212 | 94.34 |
| 100 | 200 | 100.00 |
| 94 | 188 | 106.38 |
| 89 | 178 | 112.36 |
| 84 | 168 | 119.05 |
| 80 | 160 | 125.00 |
| 76 | 152 | 131.58 |
| 73 | 146 | 136.99 |
| 70 | 140 | 142.86 |
| 67 | 134 | 149.25 |
| 64 | 128 | 156.25 |
| 62 | 124 | 161.29 |
| 60 | 120 | 166.67 |
| 58 | 116 | 172.41 |
| 56 | 112 | 178.57 |
| 54 | 108 | 185.19 |
| 52 | 104 | 192.31 |
| 51 | 102 | 196.08 |
| 49 | 98 | 204.08 |
| 48 | 96 | 208.33 |
| 46 | 92 | 217.39 |
| 45 | 90 | 222.22 |
| 44 | 88 | 227.27 |

Total clock cycles = 6044
Total time = 302.2 microseconds

I claim:

1. A spread spectrum communication system comprising: at least one intelligence transmitting device including sequence generator means for generating an intelligence wavetrain modulated in accordance with information to be transmitted, and a synchronization transmitting device for generating an unmodulated synchronization wavetrain in timed relation to said intelligence wavetrain, each of said wavetrains including a sequence of variations having predetermined varying durations and in a predetermined distinctive pseudo-random order, further including clock means for supplying a clock signal for operation of said sequence generator means, and means including selectively controlled cycle swallowing means for applying said clock signal to said signal generator means for selective control of the effective frequency of said clock signal.

2. A system as defined in claim 1, further including microprocessor means for controlling said sequence generator means of said receiving devices to obtain said predetermined timed relation of said synchronization wavetrain and said intelligence wavetrain.

3. A receiver system comprising at least one intelligence receiving device including sequence generator means for generating a signal for detection of an intelligence wavetrain modulated in accordance with information to be transmitted, and a synchronization receiving device for including sequence generating means for detection of an unmodulated synchronization wavetrain received in timed relation to said intelligence wavetrain, each of said wavetrains including a sequence of variations having predetermined varying durations and in a predetermined distinctive pseudo-random order, further including clock means for supplying a clock signal for operation of said sequence generator means, and means including selectively controlled cycle swallowing means for applying said clock signal to said signal generator means for selective control of the effective frequency of said clock signal.

4. A system comprising at least one intelligence receiving device including sequence generator means for generating a signal for detection of an intelligence wavetrain modulated in accordance with information to be transmitted, and a synchronization receiving device for including sequence generating means for detection an unmodulated synchronization wavetrain received in timed relation to said intelligence wavetrain, each of said wavetrains including a sequence of variations having predetermined varying durations and in a predetermined distinctive pseudo-random order, wherein each of said sequence generator means comprises first counter means for generating a sequence signal, memory means for controlling counting of said first counter means, and second counter means for controlling said memory means, further including reset circuitry for controlling timed reset of said first and second counter means of one sequence generator with reset of said first and second counter means of another.

5. A spread spectrum communication system comprising: sequence generator means arranged to respond to an applied clock signal for generating a wavetrain including a sequence of variations having predetermined varying durations and in a predetermined distinctive pseudo-random order, means for supplying an intelligence signal containing intelligence to be transmitted, modulator means responsive to said wavetrain and to said intelligence signal to produce a modulated wavetrain, and output means responsive to said modulated wavetrain, further including clock means for supplying a clock signal having a frequency fixed to within certain limits of accuracy, means including cycle swallowing means for applying said clock signal to said signal generator means, and cycle swallow control means for controlling said cycle swallowing means to swallow cycles at certain controllable times and to reduce to a controllable degree the effective frequency of said clock signal as applied to said sequence generator means.

6. A spread spectrum communication system as defined in claim 5, wherein said cycle swallow control means includes means for providing count-down means responsive to said clock signal and having a plurality of stages operative to supply a plurality of periodic signals at frequencies which are sub-multiples of said clock signal, and means for selectively gating said periodic signals to said cycle swallowing means to control said effective frequency of said clock signal as applied to said sequence generator means.

7. A spread spectrum communication system comprising: receiving means for receiving an intelligence signal containing intelligence to be transmitted and including a received wavetrain which includes a sequence of variations having predetermined varying durations and in a predetermined distinctive pseudo-random order and which is modulated in accordance with said intelligence, sequence generator means arranged to respond to an applied clock signal for developing a generated wavetrain of substantially the same form as said received wavetrain but of substantially constant amplitude, demodulator means including a product detector responsive to said generated wavetrain and to said intelligence signal to demodulate said received wavetrain and output an intelligence signal, clock means for supplying a clock signal, means including cycle swallowing means for applying said clock signal to said sequence generator means, and cycle swallow control means for controlling said cycle swallowing means to swallow cycles at certain controllable times and to control synchronization of said generated wavetrain and said received wavetrain.

8. A spread spectrum communication system as defined in claim 7, wherein said cycle swallow control means operate to control the effective frequency of said clock signal as applied to said sequence generator means.

9. A spread spectrum communication system as defined in claim 7, wherein said cycle swallow control means operate to swallow cycles to controllably shift the phase of operation of said sequence generator means.

10. A spread spectrum communication system as defined in claim 9, wherein said cycle swallow means operate to controllably shift said phase of operation of said sequence generator means in a scanning operation to establish a proper phase of said generated wavetrain relative to said received wavetrain, and wherein said cycle swallow control means operate to control the effective frequency of said clock signal as applied to said sequence generator means and to maintain said proper phase once established.

11. A spread spectrum system comprising: sequence generator means for generating a sequence of variations having predetermined varying durations and in a predetermined distinctive pseudo-random order, said sequence generator means comprises first counter means for developing said sequence of variations, memory means for controlling counting of said first counter means for control of said varying durations, second counter means controlled from said first counter means for controlling said memory means to establish said pseudo-random order, means for supplying a timing signal for control of a start time at which said sequence generator should start from a reset condition, and reset circuitry responsive to a reset control signal for thereafter responding to said timing signal and control starting of said first and second counter means of said sequence generator from a reset condition.

12. A spread spectrum communication system as defined in claim 11, said reset circuitry including gating means for applying clock pulses to said first counter means of the first sequence generator means, means responsive said reset control signal and to said timing signal and coupled to said second counter means for controlling said gating means to temporarily discontinue application of said clock pulses to said first counter means when said second counter means reaches a certain condition and for thereafter controlling said gating means to continue application of clock pulses to said first counter means in response to said timing signal.

13. A spread spectrum communication system as defined in claim 11, including second sequence generator means for generating a second sequence of variations having predetermined varying durations and in a predetermined pseudo-random order, said second sequence generator means comprising third counter means for developing said second sequence of variations, memory means for controlling counting of said third counter means for control of said varying durations of said second sequence, fourth counter means controlled from said third counter means for controlling said second memory means to establish said pseudo-random order of said second sequence, said reset circuitry being controlled from said second sequence generator means to control timed reset of said first and second counter means of said first sequence generator means.

14. A receiver for a spread spectrum communication system, comprising: input means for input of a received wavetrain which includes a sequence of variations having predetermined varying durations and in a predetermined pseudo-random order, sequence generator means for developing a generated wavetrain of a form similar to the form of said received wavetrain, product detector means responsive to said received and generated wavetrains to develop an output signal corresponding to a degree of correlation of said received and generated wavetrains, scanning means for effecting scanning operations to control said sequence generator means to effect progressive changes in phase of said generated wavetrain, monitoring means for effecting measurements of said output signal, and control means coupled to said scanning and monitoring means for effecting a plurality of determinations at a number of times of the phase at which said output signal is at a peak value and for controlling operation of said receiver as a function of a comparison of said plurality of said determinations.

15. A receiver as defined in claim 14, including clock means for supplying clock signals to said sequence generator means, said control means being arranged to control the effective frequency of said clock signals as a function of said comparison of said determinations of said phase at said number of times.

16. A receiver as defined in claim 14, said received wavetrain being a synchronization wavetrain of substantially constant amplitude and said input means being operative for input of a second received wavetrain which includes a sequence of variations having predetermined varying durations and in a predetermined pseudo-random order, said second received wavetrain being in synchronized relation to said synchronization wavetrain and being an intelligence wavetrain modulated in accordance with intelligence to be received, second sequence generator means for developing a second generated wavetrain which includes a sequence of variations of a form similar to the form of said sequence of variations of said second received wavetrain, second product detector means responsive to said second received and second generated wavetrains to develop a second output signal corresponding to a degree of correlation of said received and generated wavetrains for output of said intelligence, and said control means being operative for control of said second sequence generator means in synchronizing the operation of said second sequence generator means with said received synchronization wavetrain.

17. A spread spectrum communication system as defined in claim 14, said control means being operable in response to a certain difference between said phase determinations to control said scanning means and effect a halt of said progressive changes in phase of said generated wave train.

18. A spread spectrum communication system as defined in claim 14, wherein said sequences of variations of said received and generated wavetrains are periodically repeated sequences, said control means after controlling said scanning means to effect said halt of said progressive changes being operative to adjust the operation of said sequence generator means as a function of measurements of said output signal by said monitoring means.

19. A receiver for a spread spectrum communication system, comprising: input means for input of a plurality of received wavetrains each of which includes a sequence of variations having predetermined varying durations and in a predetermined pseudo-random order, sequence generator means for developing a plurality of generated wavetrains respectively corresponding to said received wavetrains, each generated wave train including a sequence of variations having a form similar to the form of the corresponding received wavetrain, a plurality of product detector means respectively corresponding to said received and generated wavetrains, each of said product detector means being responsive to the corresponding received and generated wavetrains to develop an output signal corresponding to a degree of correlation of said corresponding received and generated wavetrains, scanning means for effecting scanning operations to control said sequence generator means and effect progressive changes in phase of one of said generated wavetrains, and control means coupled to said scanning means and to one of said product detector means which corresponds to said one of said generated wave trains, said control means being operative for controlling operation of said sequence generator means in response to a comparison of a plurality of determinations of phase at which said output signal from said one of said product detector means is at a peak value.

20. A receiver as defined in claim 19, said control means being operative for controlling said sequence generator means to control synchronization of at least one other of said generated wavetrains with each corresponding received wavetrain.

21. A receiver as defined in claim 19, said control means being operative in response to a certain difference between said phase determinations to control said scanning means and effect a halt of said progressive changes in phase of said one of said generated wave trains and to synchronize the generation of all of said generated wavetrains with the corresponding received wave trains.

22. A spread spectrum communication system as defined in claim 19, wherein said sequences of variations of said received and generated wavetrains are periodically repeated sequences, said control means after controlling said scanning means to effect said halt of said progressive changes in phase of said one of said generated wavetrains being operative to adjust the operation of said sequence generator means as a function of measurements of output signals of a plurality of said product detector means and to maintain synchronization of the generation of all of said generated wavetrains with the corresponding received wavetrains.

23. A receiver for a spread spectrum communication system, comprising: input means for input of a plurality of received wavetrains each of which includes a sequence of variations having predetermined varying durations and in a predetermined pseudo-random order, a first one of said received wavetrains being modulated by one phase of an intelligence signal and a second one of said received wavetrains being modulated by an opposite phase of said intelligence signal, sequence generator means for developing a plurality of generated wavetrains respectively corresponding to said received wavetrains, each generated wave train including a sequence of variations having a form similar to the form of the corresponding received wavetrain, a plurality of product detector means respectively corresponding to said received and generated wavetrains, each of said product detector means being responsive to the corresponding received and generated wavetrains to develop an output signal corresponding to a degree of correlation of said corresponding received and generated wavetrains, said product detectors including first and second product detectors respectively corresponding to said first and second ones of said received wavetrains, and comparator means for developing a signal corresponding to a difference between outputs of first and second product detectors for developing an output corresponding to said intelligence signal, and control means for controlling synchronization of said generated wavetrains with said received wavetrains.

24. A receiver as defined in claim 23, summing means for developing an output corresponding to the sum of said outputs of said first and second product detector means, said control means being responsive to said output of said summing means for controlling synchronization of said generated wavetrains with said received wavetrains.

25. A receiver as defined in claim 24, a third one of said received wavetrains being modulated by one phase of a second intelligence signal and a fourth one of said received wavetrains being modulated by an opposite phase of said second intelligence signal, said product detectors further including third and fourth product detectors respectively corresponding to said third and fourth ones of said received wavetrains, second comparator means for developing a signal corresponding to a difference between outputs of third and fourth product detectors for developing an output corresponding to said second intelligence signal, and second summing means for developing an output corresponding to the sum of said outputs of said third and fourth product detector means, said control means being responsive to a comparison of said outputs of the first summing means and said second summing means for controlling synchronization of said generated wavetrains with said received wavetrains.

26. A receiver as defined in claim 25, wherein said first, second, third and fourth ones of said received wavetrains have a fixed phase relation to a received wavetrain reference phase, said sequence generator means being operable to generate said first, second, third and fourth generated wave trains in fixed phase relation to a generator reference phase, said generator reference phase being changeable in one direction away from said received wavetrain reference phase to increase the output from said first and second product detector means and decrease the output from said third and fourth product detector means and being changeable in the opposite direction away from said received wavetrain reference phase to decrease the output from said first and second product detector means while increasing the output from said third and fourth product detector means, said control means being operable in response to the direction and magnitude of a difference between outputs of said first and second summing means to change said generator reference phase toward said received wavetrain reference phase.

27. A spread spectrum communication system, comprising transmitter means for transmitting a plurality of wavetrains each of which includes a sequence of variations having predetermined varying durations and in a predetermined pseudo-random order, a first one of said wavetrains being modulated by one phase of an intelligence signal and a second one of said wavetrains being modulated by an opposite phase of said intelligence signal, a receiver for receiving said transmitted wavetrains and developing corresponding received wavetrains, said receiver comprising sequence generator means for developing a plurality of generated wavetrains respectively corresponding to said received wavetrains, each generated wave train including a sequence of variations having a form similar to the form of the corresponding received wavetrain, a plurality of product detector means respectively corresponding to said received and generated wavetrains, each of said product detector means being responsive to the corresponding received and generated wavetrains to develop an output signal corresponding to a degree of correlation of said corresponding received and generated wavetrains, said product detectors including first and second product detectors respectively corresponding to received wavetrains which correspond to said first and second ones of said transmitted wavetrains, and comparator means for developing a signal corresponding to a difference between outputs of first and second product detectors for developing an output corresponding to said intelligence signal, and control means for controlling synchronization of said generated wavetrains with said received wavetrains.

28. A spread spectrum communication system, comprising transmitter means including means for generating a first signal in the form of a wavetrain which includes a sequence of variations having predetermined varying durations and in a predetermined pseudo-random order, first modulator means for modulating said first signal in accordance with an intelligence signal to be transmitted to produce a second signal in the form of a modulated wavetrain, means for supplying a third signal in the form of a carrier signal having a certain frequency, and second modulator means for modulating said third signal with said second signal to produce a fourth signal, and a receiver including fourth signal reproducing means for producing a fifth signal in the form of a reproduction of said fourth signal produced in said transmitter means, first demodulator means for demodulating said fifth signal to produce a sixth signal in the form of a reproduction of said second signal produced in said transmitter means, and second demodulating means for demodulating said sixth signal to reproduce said intelligence signal, each of said variations of said wavetrain generated in said transmitter means having one polarity during an initial phase of the variation of the sequence of variations of the wavetrain and an opposite polarity during a final phase of the variation of the sequence of variations of the wavetrain, said second demodulating means in said receiver means comprising means for generating a wavetrain of the same form as that generated in said transmitter means, and product detector means for producing an output signal corresponding to the product of said wavetrain generated in said receiver means and said sixth.

29. A system as defined in claim 28, said transmitter means including means for supplying a seventh signal in the form of a carrier signal having a frequency higher than said certain frequency of said third signal, and means for modulating said seventh signal with said fourth signal to produce an eighth signal, and said fourth signal reproducing means of said receiver comprising means for producing a ninth signal in the form of a reproduction of said eighth signal produced in said transmitter means, and third demodulator means for demodulating said ninth signal to produce said fifth signal.

30. A spread spectrum communication system, comprising transmitter means including means for generating a wavetrain which includes a sequence of variations having predetermined varying durations and in a predetermined pseudo-random order, first modulator means for modulating said wavetrain in accordance with intelligence to be transmitted to produce a modulated wavetrain, means for supplying a plurality of carrier signals having different frequencies, a plurality of second modulator means for modulating each of said carrier signals with said modulated wavetrain to produce a plurality of modulated carrier signals, and a receiver including modulated signal reproducing means for producing a plurality of reproduced modulated carrier signals derived from said plurality of modulated carrier signals produced in said transmitter means, first demodulator means for demodulating said plurality of reproduced modulated carrier signals to produce a reproduced modulated wavetrain, and second demodulator means for demodulating said reproduced modulated wavetrain to reproduce said intelligence signal.

31. A system as defined in claim 30, said carrier signals being in a certain frequency range, and said transmitter means including means for producing a higher frequency carrier signal at a frequency substantially higher than said certain frequency range, and means for modulating said higher frequency carrier signal with said plurality of modulated signals to produce a higher frequency modulated carrier signal, and said receiver modulated carrier signal reproducing means including means for producing a reproduced higher frequency modulated carrier signal derived from said higher frequency modulated carrier signal produced in said transmitter means, and third demodulator means for demodulating said reproduced higher frequency modulated carrier signal to produce said plurality of reproduced modulated signals derived from said plurality of modulated signals produced in said transmitter means.

32. A spread spectrum communication system comprising: transmitter means including sequence generator means for producing a plurality of wavetrains each including a sequence of variations having predetermined varying durations and in a predetermined pseudo-random order, and means for modulating at least one of said wavetrains in accordance with an intelligence signal to be transmitted, and receiver means including sequence generator means for producing a plurality of wavetrains which correspond to said plurality of wavetrains produced in said transmitter means each including a sequence of variations having the same predetermined varying durations and the same predetermined pseudo-random order as the corresponding wavetrain produced in said transmitter means, product detector means responsive to signals derived from said wavetrains produced and modulated in said transmitter means and to said corresponding wavetrains produced by said sequence generator means of said receiver to reproduce said intelligence signal, first microprocessor means in said transmitter and second microprocessor means in said receiver for controlling said sequence generator means, first control data input means in said transmitter and second control data input means in said receiver for respectively supplying control data to said first and second microprocessor means to control the form of said variations in said wavetrains generated by said sequence generator means of both said transmitter and receiver means.

33. A system as defined in claim 32, said sequence generator means comprising clock means for supplying clock signals, and digital counter circuitry operated controlled from said clock signal to generate said wavetrains, said first and second microprocessor means being operative to control the frequencies of said clock signals to control the said predetermined varying durations of said variations.

34. A system as defined in claim 32, said sequence generator means comprising clock means for supplying clock signals, digital memory means, and digital counter circuitry controlled from said clock signal and said memory means to generate said wavetrains, said first and second microprocessor means being operative to control data in said memory means to control said predetermined pseudo-random orders of said variations in said wavetrains.

35. A system as defined in claim 32, said transmitter means including means for supplying at least one carrier signal of a certain frequency, and means for producing a modulated carrier signal by effecting modulation of said carrier signal by said wavetrains after modulation of said at least one of said wavetrains in accordance with an intelligence signal to be transmitted, and said receiver means comprising demodulator means operable in the range of said certain frequency for demodulating a signal derived from said modulated carrier signal to reproduce said wavetrains produced in said transmitter means, said first and second microprocessor means being controlled from said control data to control said certain frequency of generation of said carrier signal and to control corresponding demodulation of said signal derived from said modulated carrier signal.

* * * * *